United States Patent [19]
Knowles et al.

[11] Patent Number: 5,661,292
[45] Date of Patent: *Aug. 26, 1997

[54] AUTOMATIC LASER PROJECTION SCANNER WITH IMPROVED LASER BEAM SCANNING EFFICIENCY

[75] Inventors: Carl H. Knowles, Moorestown; George B. Rockstein, Audubon; David M. Wilz; Charles A. Naylor, both of Sewell, all of N.J.

[73] Assignee: Metrologic Instruments, Inc., Blackwood, N.J.

[ * ] Notice: The term of this patent shall not extend beyond the expiration date of Pat. No. 5,340,973.

[21] Appl. No.: 561,479

[22] Filed: Nov. 20, 1995

Related U.S. Application Data

[63] Continuation of Ser. No. 293,695, Aug. 19, 1994, Pat. No. 5,468,951, which is a continuation of Ser. No. 898,919, Jun. 12, 1992, Pat. No. 5,340,973, which is a continuation-in-part of Ser. No. 761,123, Sep. 17, 1991, Pat. No. 5,340,971, which is a continuation-in-part of Ser. No. 583,421, Sep. 17, 1990, Pat. No. 5,260,553.

[51] Int. Cl.⁶ ..................................................... G06K 7/10
[52] U.S. Cl. .................... 235/472; 235/462; 235/470
[58] Field of Search .................................. 235/462, 472, 235/470, 454

[56] References Cited

U.S. PATENT DOCUMENTS

| | | |
|---|---|---|
| D. 305,885 | 2/1990 | Barkan et al. . |
| D. 307,894 | 5/1990 | Siemiatkowski . |
| 3,911,270 | 10/1975 | Traub . |
| 3,978,317 | 8/1976 | Yamaguchi et al. . |
| 4,072,859 | 2/1978 | McWaters . |
| 4,086,476 | 4/1978 | King . |
| 4,136,821 | 1/1979 | Sugiura et al. . |
| 4,240,064 | 12/1980 | DevChoudhury . |
| 4,387,297 | 6/1983 | Swartz et al. . |
| 4,409,470 | 10/1983 | Shepard et al. . |
| 4,431,912 | 2/1984 | Dickson et al. . |
| 4,460,120 | 7/1984 | Shepard et al. . |
| 4,496,831 | 1/1985 | Swartz et al. . |

(List continued on next page.)

FOREIGN PATENT DOCUMENTS

| | | |
|---|---|---|
| 0 424 097 A1 | 4/1991 | European Pat. Off. . |
| 0 424 976 A2 | 5/1991 | European Pat. Off. . |
| 0 517 958 A2 | 12/1992 | European Pat. Off. . |

OTHER PUBLICATIONS

"Hand–Held Holographic Scanner Having Highly Visible Locator Beam" by R. T. Cato, published in IBM Technical Disclosure Bulletin, vol. 27, No. 4A, Sep. 1984.
Hand–held Bar Code Symbol Scanner, Sep. 1984.
Product Brochure and Schematic Diagram for Metrologic SS–200 Magazine Scanner by Metrologic Instruments, Inc.
Laser Bar Code Symbol Scanner with Hardware–Implemented Digital Count Data Filter, Circa 1979.
Product Brochure and Schematic Diagram for MH290 Hand Held Laser Scanner by Metrologic Instruments, Inc.
Hand–Held Laser Bar Code Symbol Scanner with Software Implemented Digital Count–Data Filter, Circa 1987.

*Primary Examiner*—Donald T. Hajec
*Assistant Examiner*—Karl Frech
*Attorney, Agent, or Firm*—Hopgood, Calimafde Kalil & Judlowe

[57] ABSTRACT

An automatic projection laser scanning system for reading bar code symbols. The system is supportable on or above a countertop surface, and includes a laser scanning device having a compact housing from which it automatically produces an object detection field of volumetric expanse for automatic detection of objects, and a scan field including at least one scanning plane for automatic laser scanning of code symbols on detected objects. Both the object detection field and the scan field spatially arranged with respect to each other and the compact housing to facilitate easy scanning of a bar code symbol presented within the scan field after the associated object has been detected within the object detection field, thereby improving the scanning efficiency of the system.

41 Claims, 23 Drawing Sheets

U.S. PATENT DOCUMENTS

| | | |
|---|---|---|
| 4,521,678 | 6/1985 | Winter . |
| 4,570,057 | 2/1986 | Chadima, Jr. et al. . |
| 4,575,625 | 3/1986 | Knowles . |
| 4,603,262 | 7/1986 | Eastman et al. . |
| 4,639,606 | 1/1987 | Boles et al. . |
| 4,673,805 | 6/1987 | Shepard et al. . |
| 4,736,095 | 4/1988 | Shepard et al. . |
| 4,766,297 | 8/1988 | McMillan . |
| 4,766,299 | 8/1988 | Tierney et al. . |
| 4,816,660 | 3/1989 | Swartz et al. . |
| 4,825,057 | 4/1989 | Swartz et al. . |
| 4,845,349 | 7/1989 | Cherry . |
| 4,877,949 | 10/1989 | Danielson et al. . |
| 4,897,532 | 1/1990 | Swartz et al. . |
| 4,920,255 | 4/1990 | Gabeler . |
| 4,930,848 | 6/1990 | Knowles . |
| 4,933,538 | 6/1990 | Heiman et al. . |
| 4,962,980 | 10/1990 | Knowles . |
| 4,970,379 | 11/1990 | Danstrom . |
| 5,015,833 | 5/1991 | Shepard . |
| 5,017,765 | 5/1991 | Shepard et al. . |
| 5,059,777 | 10/1991 | Wittensoldner et al. . |
| 5,086,215 | 2/1992 | Carsner et al. . |
| 5,107,100 | 4/1992 | Shepard et al. . |
| 5,132,523 | 7/1992 | Bassett . |
| 5,155,346 | 10/1992 | Doing et al. . |
| 5,180,904 | 1/1993 | Shepard et al. . |
| 5,198,650 | 3/1993 | Wike, Jr. . |
| 5,212,370 | 5/1993 | Wittensoldner et al. . |
| 5,216,231 | 6/1993 | Ouchi . |
| 5,250,790 | 10/1993 | Melitsky et al. . |
| 5,260,553 | 11/1993 | Rockstein ............... 235/462 |
| 5,262,627 | 11/1993 | Shepard . |
| 5,280,162 | 1/1994 | Marwin . |
| 5,324,924 | 6/1994 | Cai et al. . |
| 5,340,971 | 8/1994 | Rockstein ............... 235/472 |
| 5,340,973 | 8/1994 | Knowles ............... 235/472 |
| 5,468,951 | 11/1995 | Knowles ............... 235/472 |

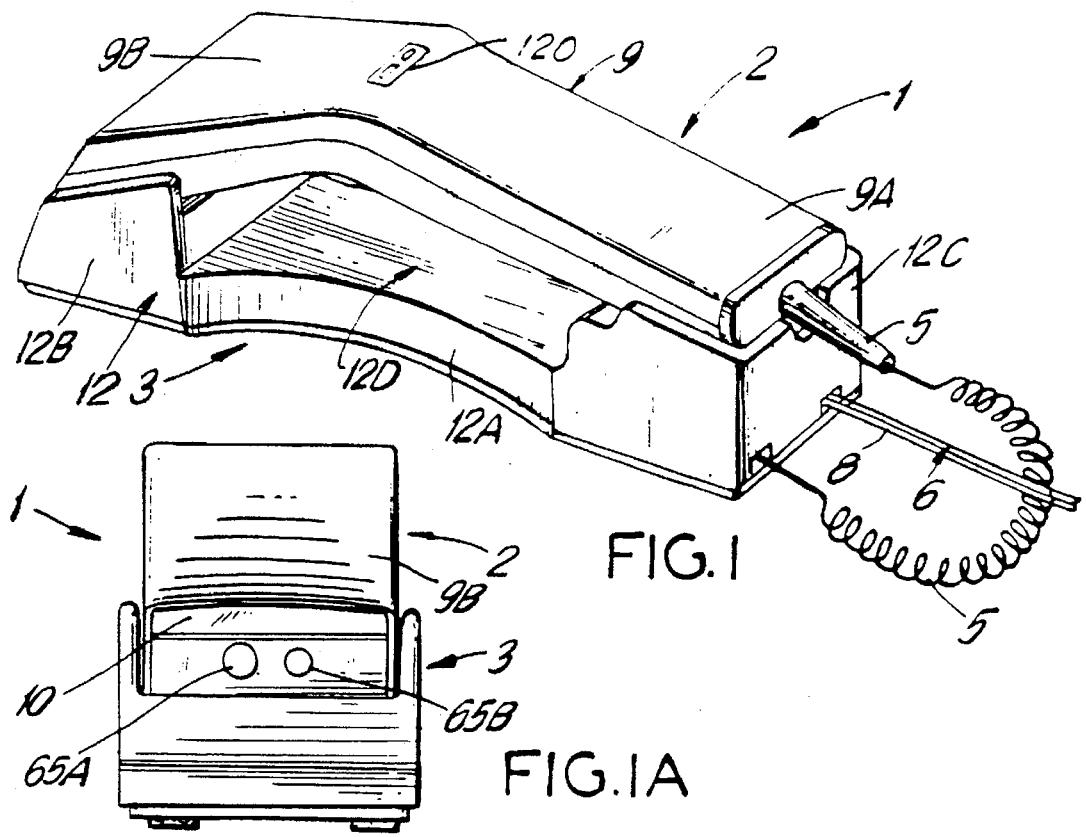
FIG.1
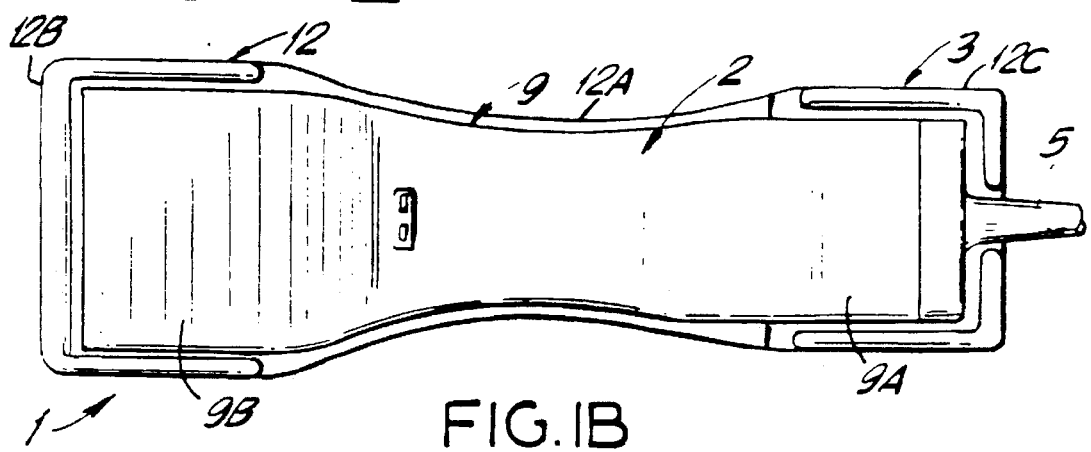
FIG.1A
FIG.1B
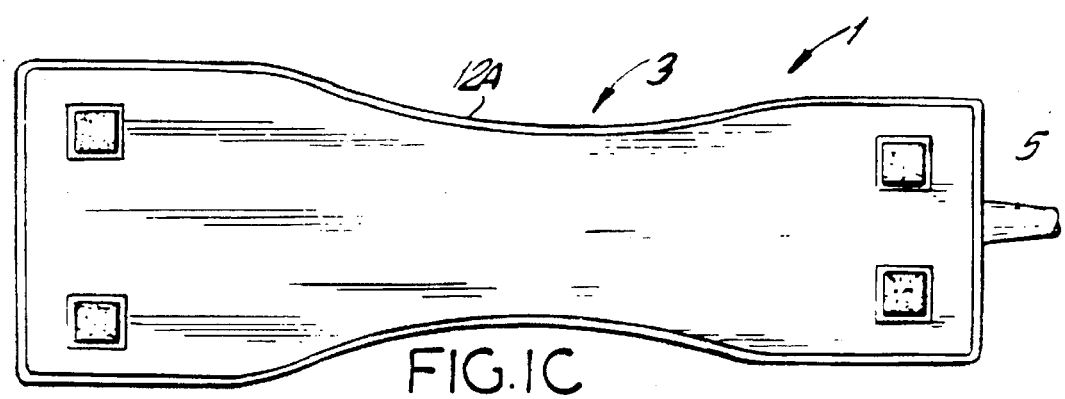
FIG.1C

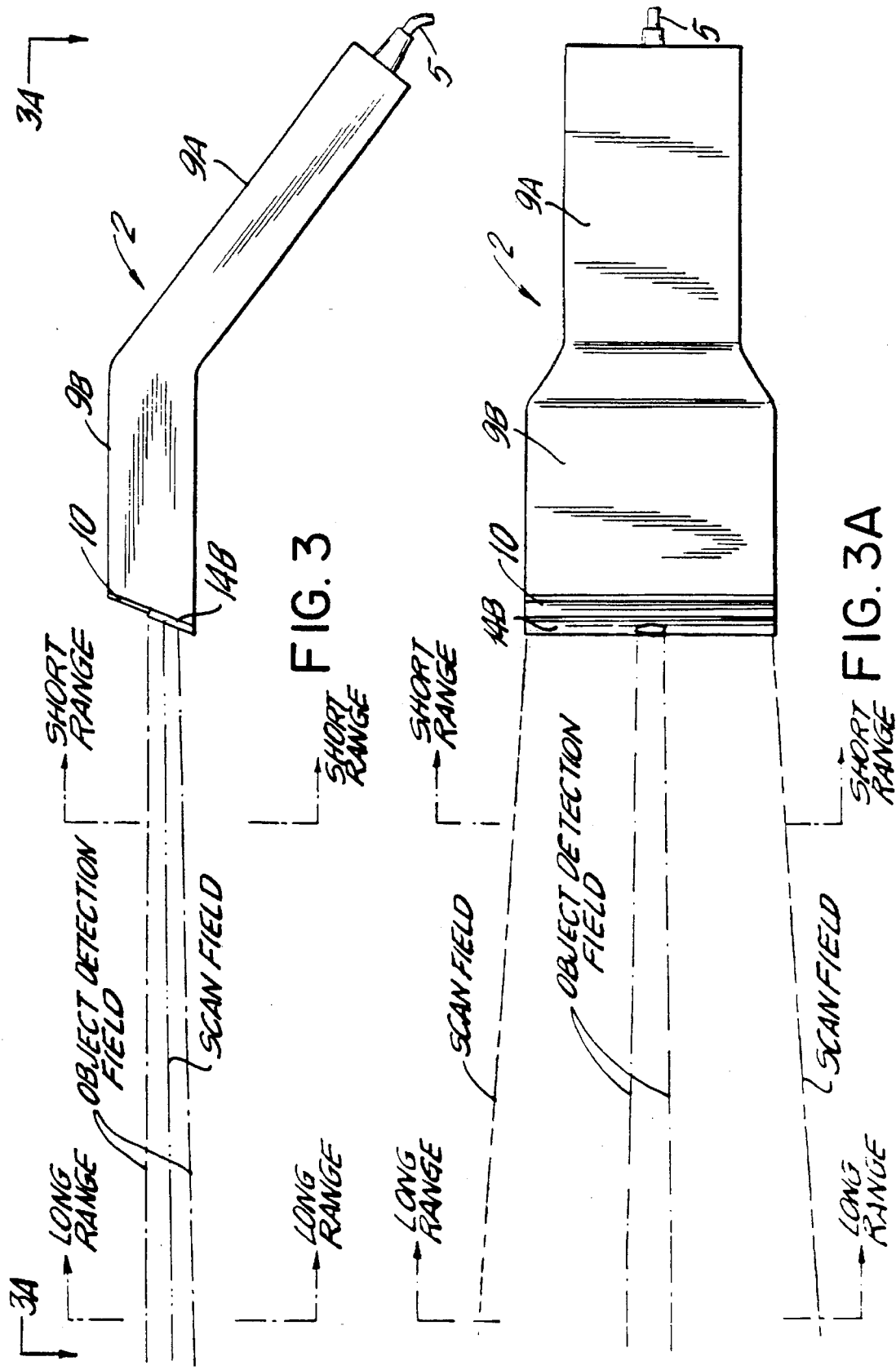

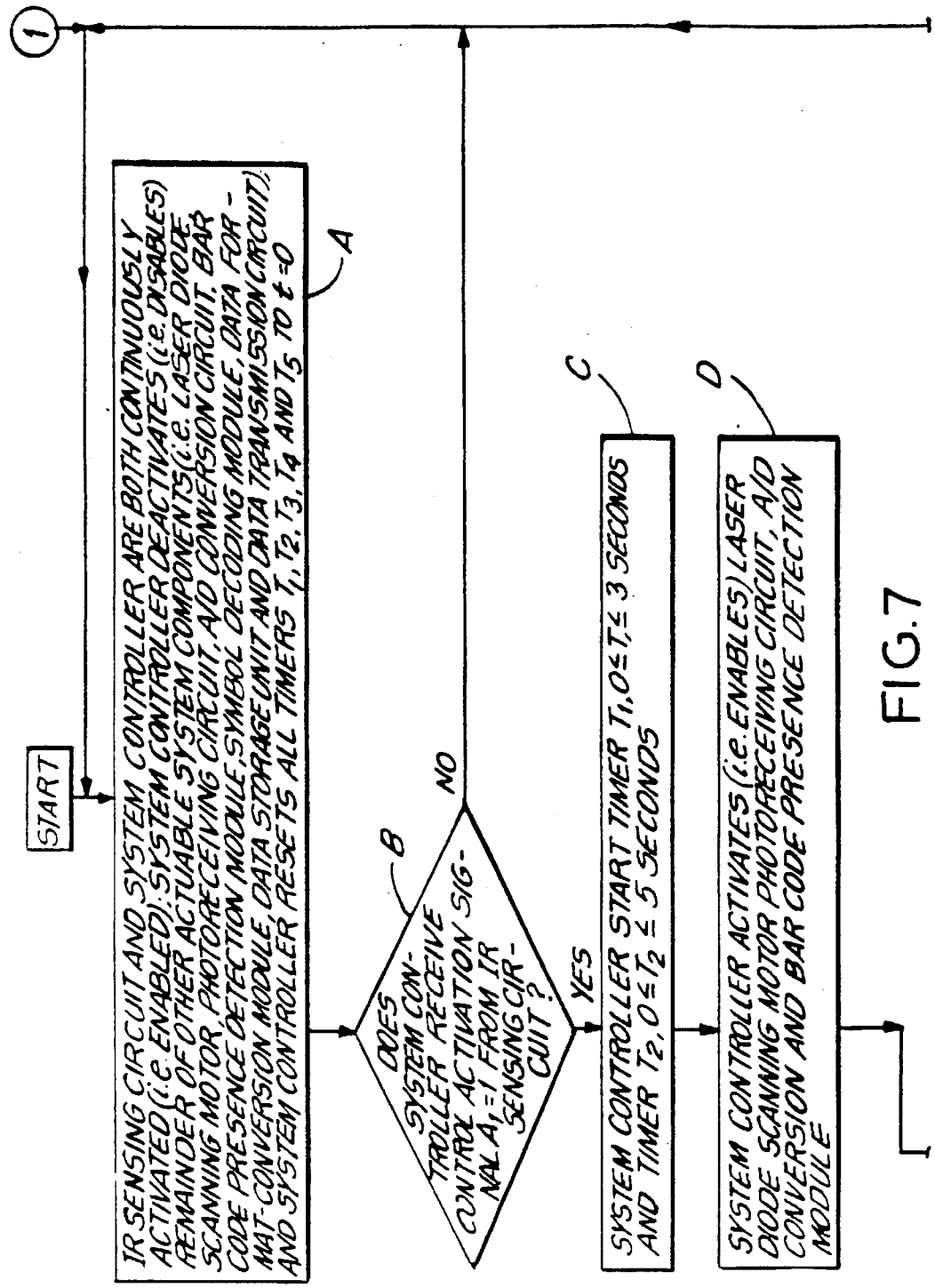

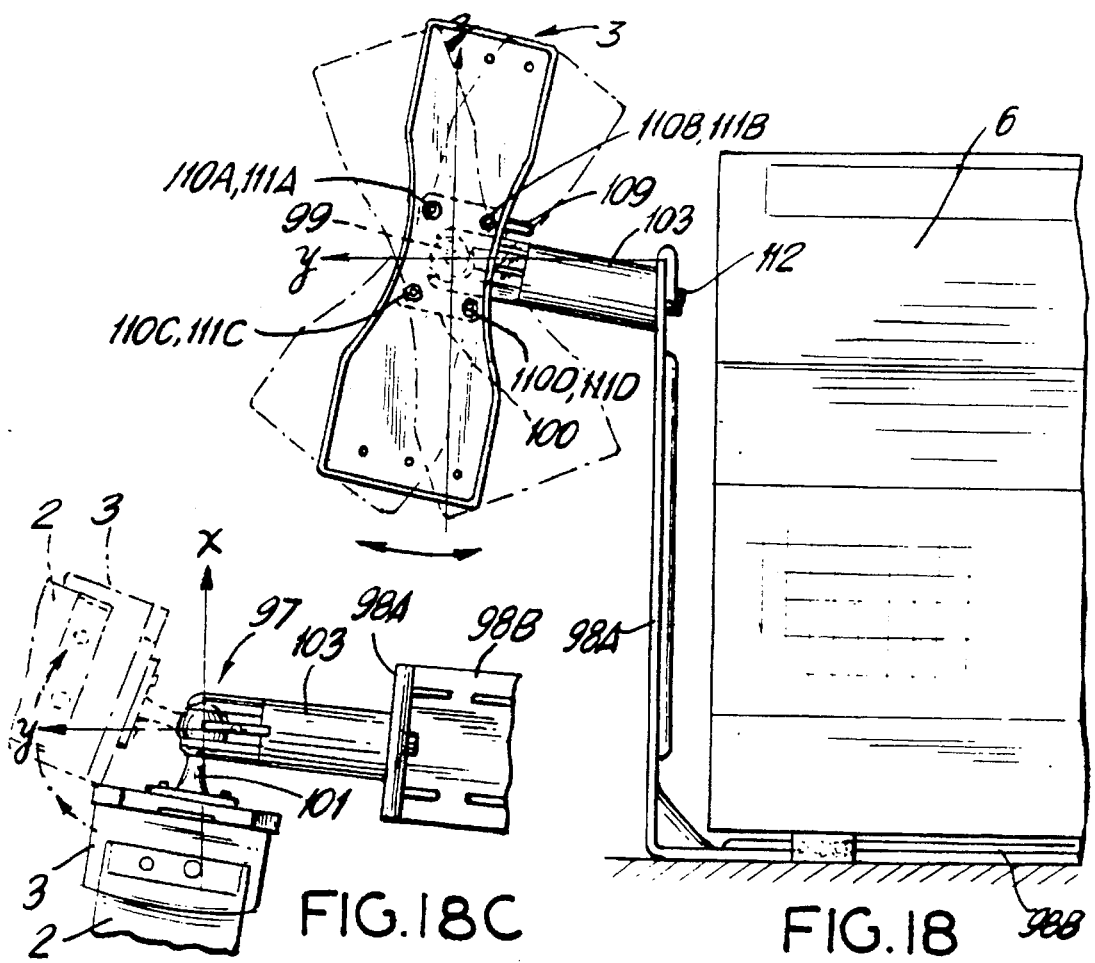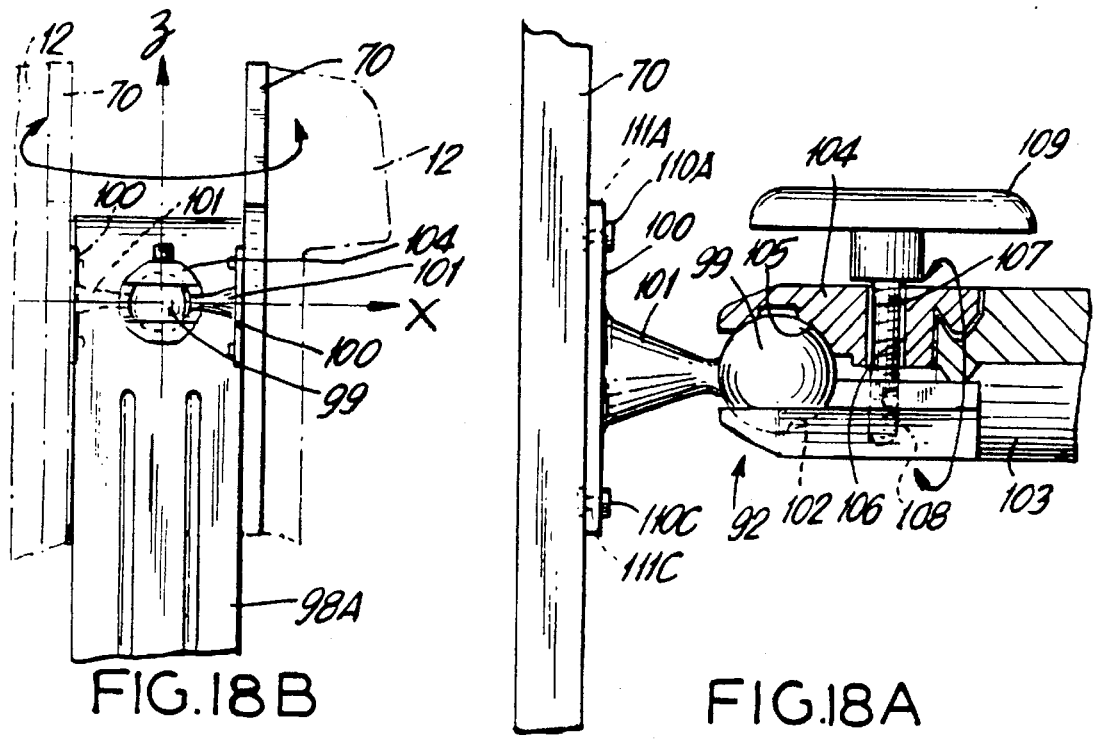

AUTOMATIC LASER PROJECTION SCANNER WITH IMPROVED LASER BEAM SCANNING EFFICIENCY

This application is a continuation of application Ser. No. 08/293,695 filed Aug. 19, 1994, entitled "AUTOMATIC HAND-SUPPORTABLE CODE SYMBOL SCANNING DEVICE WITH IMPROVED LASER BEAM POINTING EFFICIENCY", now U.S. Pat. No 5,468,951; which is a continuation of application Ser. No. 07/898,919 filed Jun. 12, 1992 entitled "AUTOMATIC LASER SCANNING SYSTEM AND METHOD OF READING BAR CODE SYMBOLS USING SAME", Now U.S. Pat. No. 5,340,973; which is a continuation-in part of application Ser. No. 07/761,123 filed Sep. 17, 1991, entitled "METHOD AND APPARATUS FOR AUTOMATICALLY READING BAR CODE SYMBOLS", now U.S. Pat. No. 5,340,971, which is a continuation-in-part of application Ser. No. 07/583,421 filed Sep. 17, 1990, now U.S. Pat. No. 5,260,553; and each being incorporated herein by reference.

BACKGROUND OF THE INVENTION

1. Field of the Invention

The present invention relates generally to laser scanning systems, and more particularly to an automatic bar code symbol reading system in which an automatic hand-supportable laser scanner can be interchangeably utilized as either a portable hand-held laser scanner in an automatic "hands-on" mode of operation, or as a stationary laser projection scanner in an automatic "hands-free" mode of operation.

2. Brief Description of the Prior Art

Bar code symbols have become widely used in many commercial environments such as, for example, point-of-sale (POS) stations in retail stores and supermarkets, inventory and document tracking, and diverse data control applications. To meet the growing demands of this recent innovation, bar code symbol readers of various types have been developed for scanning and decoding bar code symbol patterns and producing symbol character data for use as input in automated data processing systems.

In general, prior art bar code symbol readers using laser scanning mechanisms can be classified into two categories.

The first category of bar code symbol readers includes systems having lightweight, portable hand-held laser scanners which can be supported in the hand of the user. The user positions the hand-held laser scanner at a specified distance from the object bearing the bar code symbol, manually activates the scanner to initiate reading, and then moves the scanner over other objects bearing bar code symbols to be read. Prior art bar code symbol readers illustrative of this first category are disclosed in U.S. Pat. Nos. 4,387,297 to Swartz; 4,575,625 to Knowles; 4,845,349 to Cherry; 4,825,057 to Swartz, et al.; 4,903,848 to Knowles; 5,107,100 to Shepard, et al.; 5,080,456 to Katz, et al.; and 5,047,617 to Shepard et al.

The second category of bar code symbol readers includes systems having stationary laser scanners supported on or built into an immovable structure such as a supermarket counter. These laser scanners are referred to as countertop scanners and typically utilize a moving laser beam to create a laser scan pattern. Each object bearing a bar code symbol to be read is oriented by the user and then moved through the laser scan pattern in order to read the bar code symbol. Prior art bar code symbol scanners illustrative of this second category are disclosed in U.S. Pat. Nos. 4,086,476 to King; 4,960,985 to Knowles; and 4,713,532 to Knowles.

While prior art hand-held and stationary laser scanners have played an important role in the development of the bar code symbol industry, these devices have, however, suffered from a number of shortcomings and drawbacks. For example, hand-held laser scanners, although portable and lightweight, are not always convenient to use in assembly-line applications where the user processes bar coded objects over an extended period of time, or where the user requires the use of both hands in order to manipulate the objects. In some applications, hand-held laser scanners are difficult to manipulate while simultaneously moving objects or performing other tasks at a point-of-sale terminal. Stationary laser scanners, on the other hand, provide a desired degree of flexibility in many applications by allowing the user to manipulate bar coded objects with both hands. However, by their nature, stationary laser scanners render scanning large, heavy objects a difficult task as such objects must be manually moved into or through the laser scan field.

Attempting to eliminate the problems associated with the use of hand-held and stationary laser scanners, U.S. Pat. No. 4,766,297 to McMillan discloses a bar code symbol scanning system which combines the advantages of hand-held and stationary fixed laser scanners into a single scanning system which can be used in either a hands-on or hands-free mode of operation.

The bar code symbol scanning system in U.S. Pat. No. 4,766,297 includes a portable hand-held laser scanning device for generating electrical signals descriptive of a scanned bar code symbol. In the hands-on mode of operation, a trigger on the hand-held laser scanning device is manually actuated each time a bar code symbol on an object is to be read. The system further includes a fixture having a head portion for receiving and supporting the hand-held laser scanning device, and a base portion above which the head portion is supported at a predetermined distance. In the hands-free mode of operation, the hand-held laser scanning device is supported by the fixture head portion above the fixture base portion in order to allow objects bearing bar code symbols to pass between the head and base portions of the fixture. In order to detect the presence of an object between the head and base portions of the fixture, the fixture also includes an object sensor operably connected to the hand-held laser scanning device. When the object sensor senses an object between the head portion and the base portion, the object sensor automatically initiates the hand-held laser scanning device supported in the fixture to read the bar code symbol on the detected object.

While the bar code symbol scanning system of U.S. Pat. No. 4,776,297 permits reading of printed bar code information using either a portable "hands-on" or stationary "hands-free" mode of operation, this system suffers from several significant shortcomings and drawbacks as well.

In particular, in the hands-on mode of operation, scanning bar code symbols requires manually actuating a trigger each time a bar code symbol is to be read. In the hands-free mode of operation, scanning bar code symbols requires passing the object bearing the bar code between the head and base portions of the fixture. However, in many instances where both hands are required to manipulate a bar coded object, the object is too large to be passed between the head and base portions of the fixture and thus scanning of the bar code symbol is not possible.

Thus, there is a great need in the bar code symbol reading art for a bar code symbol reading system which overcomes the above described shortcomings and drawbacks of prior art devices and techniques, while providing greater versatility in its use.

OBJECTS AND SUMMARY OF THE INVENTION

Accordingly, it is a primary object of the present invention to provide a fully automatic bar code symbol reading system having an automatic hand-supportable laser scanning device which can be used as either a portable hand-supported laser scanner in an automatic hands-on mode of operation, or as a stationary laser projection scanner in an automatic hands-free mode of operation.

It is another object of the present invention to provide such an automatic bar code symbol reading system, in which one or more bar code symbols on an object can be automatically read in a consecutive manner.

A further object is to provide such an automatic bar code symbol reading device, in which the automatic hand-supportable bar code (symbol) reading device has an infrared light object detection field which spatially encompasses at least a portion of its visible laser light scan field along the operative scanning range of the device, thereby improving the laser beam pointing efficiency of the device during the automatic bar code reading process of the present invention.

Another object of the present invention is to provide such an automatic bar code reading system in which a support frame is provided for supporting the hand-supportable housing of the device in a selected mounting position, and permitting complete gripping of the handle portion of the hand-supportable housing prior to removing it from the support frame.

A further object of the present invention is to provide such an automatic bar code symbol reading system in which the hand-supportable bar code reading device has long and short-range modes of object detection within its object detection field. In one illustrative embodiment, the long and short-range modes of object detection are manually selectable by the user by manual activation of a switch on the hand-supportable housing of the device. In another illustrative embodiment, the long-range mode of object detection is automatically selected when the hand-supportable bar code reading device is placed within the support stand during the hands-free mode of operation. In this illustrative embodiment, the short-range mode of object detection is automatically selected whenever the hand-supportable bar code reading device is picked up from the support stand and used in its hands-on mode of operation.

A further object of the present invention is to provide such an automatic bar code symbol reading system, in which the hand-supportable bar code reading device has long and short-range modes of bar code presence detection within its scan field. In one illustrative embodiment, the short-range mode of bar code presence detection is manually selectable by manual activation of a switch on the hand-supportable housing of the device. In another illustrative embodiment, the short-range mode of bar code presence detection is automatically selected when the hand-supportable bar code reading device is placed within the support stand, or alternatively, upon decoding a predesignated bar code symbol preprogrammed to induce the short-range mode of bar code presence detection. In the short range mode of bar code presence detection, the automatic bar code reading device not only detects the presence of a bar code within the scan field by analysis of collected scan data, but it further processes the collected scan data to produce digital count data representative of the measured time interval between bar and/or space transitions. Bar code symbols present within the short-range portion of the scan field, produce scan data having time interval characteristics falling within a prespecified timing data range. Using the results of this analysis, only bar code symbols scanned within the short-range portion of the scan field are deemed "detected," and only bar code symbols detected within the short-range portion of the scan field activate the decoding module of the device and thus enable bar code symbol reading.

A further object of the present invention is to provide such an automatic bar code symbol reading system in which the hand-supportable bar code reading device has long and short-range modes of bar code symbol reading within its scan field. In one illustrative embodiment, the long and short-range modes of bar code symbol reading are manually selectable by the user by manual activation of a switch on the hand-supportable housing of the device. In another embodiment, the long-range mode of object detection is automatically selected when the hand-supportable bar code reading device is placed within the support stand during the hands-free mode of operation, or alternatively, upon decoding a predesignated bar code symbol preprogrammed to induce the mode of bar code symbol reading. In this illustrative embodiment, the short-range mode of object detection is automatically selected whenever the hand-supportable bar code reading device is picked up from the support stand and used in its hands-on mode of operation. In this short-range mode of bar code symbol reading, the only decoded bar code symbols residing within the short-range portion of the scan field, are deemed "read".

It is another object of the present invention to provide an automatic hand-supportable bar code reading device which has both long and short-range modes of object detection and bar code symbol reading, automatically selectable by placing the hand-supportable device within its support stand and removing it therefrom. With this particular embodiment of the present invention, the automatic bar code symbol reading system can be used in various bar code symbol reading applications, such as, for example, charge coupled device (CCD) scanner emulation and bar code "menu" reading in the hands-on short-range mode of operation, and counter-top projection scanning in the hands-free long-range mode of operation.

An even further object of the present invention is to provide ah automatic hand-supportable bar code reading device which prevents multiple reading of the same bar code symbol due to dwelling of the laser scanning beam upon a bar code symbol for an extended period of time.

A further object of the present invention is to provide a point-of-sale station incorporating the automatic bar code symbol reading system of the present invention.

It is a further object of the present invention to provide an automatic hand-supportable bar code reading device having a control system which has a finite number of states through which the device may pass during its automatic operation, in response to diverse conditions automatically detected within the object detection and scan fields of the device.

It is yet a further object of the present invention to provide a portable, fully automatic bar code symbol reading system which is compact, simple to use and versatile.

Yet a further object of the present invention is to provide a novel method of reading bar code symbols using a automatic hand-supportable laser scanning device.

These and further objects of the present invention will become apparent hereinafter and in the claims.

BRIEF DESCRIPTION OF THE DRAWINGS

For a fuller understanding of the objects of the present invention, the Detailed Description of the Illustrated Embodiment of the Present Invention will be taken in connection with the drawings, wherein:

FIG. 1 is a perspective view of the illustrative embodiment of the automatic bar cod symbol reading system of the present invention, showing the hand-supportable laser bar code symbol reading device supported within the scanner support stand for automatic hands-free operation;

FIG. 1A is an elevated front view of the automatic bar code symbol reading system of FIG. 1, showing the light transmission window of the hand-supportable bar code symbol reading device while supported within the scanner support stand;

FIG. 1B is a plan view of the automatic bar code symbol reading system shown in FIG. 1;

FIG. 1C is a bottom view of the automatic bar code symbol reading system shown in FIG. 1;

FIG. 3 is an elevated side view of the hand-supportable bar code symbol reading device of the illustrative embodiment of the present invention, illustrating the spatial relationship between the object detection and scan fields of the device, and the long and short-ranges of programmed object detection, bar code presence detection, and bar code symbol reading;

FIG. 3A is a plan view of the automatic hand-supportable bar code symbol reading device taken along line 3A—3A of FIG. 3;

FIG. 18 is an elevated side view of the point-of-sale system of FIGS. 16, 17A and 17B, illustrating the rotational freedom of the scanner support stand about the x axis of the pivotal joint assembly;

FIG. 18A is an elevated, partially cross-sectional view of the base plate of the scanner support stand and the pivotal joint assembly connecting the scanner support stand to the pedestal base so as to provide three-degrees of freedom to the scanner support stand with respect to the stationary pedestal base;

FIG. 18B is a partially fragmented view of the scanner support stand, pivotal joint assembly and pedestal base taken along the y axis of the pivotal joint assembly, illustrating the rotational freedom of the scanner support stand about the y axis; and FIG. 18C is an elevated view of the scanner support stand and pedestal base assembly taken along the -z axis of the pivotal joint assembly, illustrating the rotational freedom of the scanner support stand about the z axis of the pivotal joint assembly.

DETAILED DESCRIPTION OF THE ILLUSTRATED EMBODIMENT OF THE PRESENT INVENTION

Figure 2:
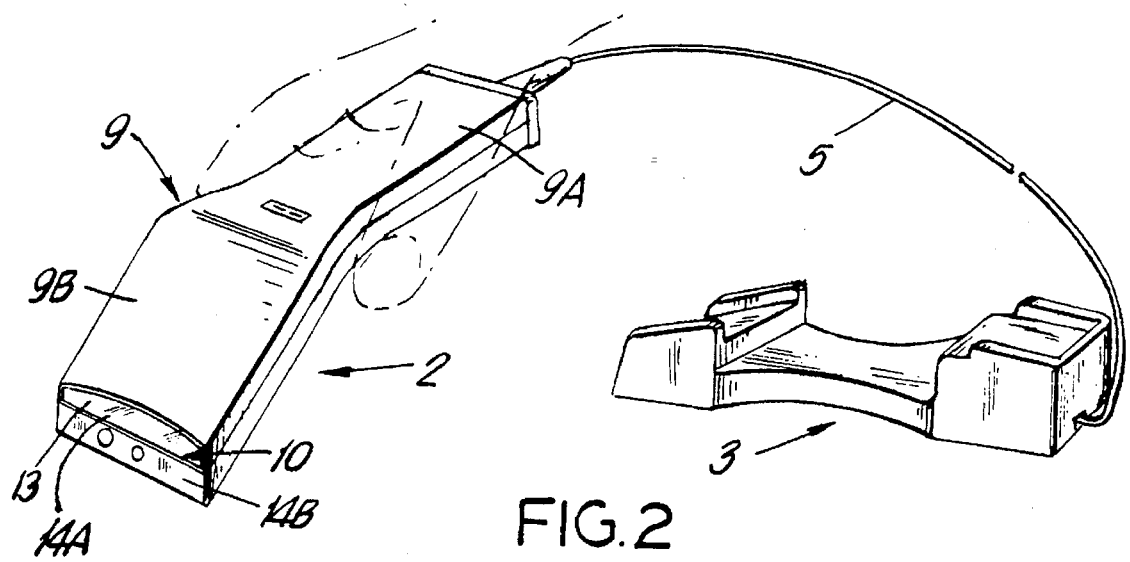
FIG. 2 is a perspective view of the automatic hand-supportable bar code symbol reading device of the system hereof, shown being used in the automatic hands-on mode of operation.

In FIG. 1, the automatic laser bar code symbol reading system of the present invention, is illustrated. As shown, automatic bar code symbol reading system 1 comprises a portable, automatic hand-supportable bar code (symbol) reading device 2 operably associated with scanner support stand 3 of the present invention. Operable interconnection of hand-supportable bar code reading device 2 and scanner support stand 3 is achieved by a flexible multiwire scanner cable 5 extending from bar code symbol device 2 into scanner support stand 3. Operable interconnection of scanner support stand 3 and a host system 6 (e.g. electronic cash register system, data collection device, etc.) is achieved by a flexible multiwire communications cable 7 extending from scanner support stand 3 and plugged directly into the data-input communications port of host system 6. In the illustrative embodiment, electrical power from a low voltage power supply (not shown) is provided to scanner support stand 3 by way of a flexible power cable 8.

As illustrated in FIG. 1 through 1C, scanner support stand 3 is particularly adapted for receiving and supporting hand-supportable bar code reading device 2 in a selected position without user support, thus providing a stationary, automatic hands-free mode of operation. In general, hand-supportable bar code reading device 2 includes an ultra-light weight hand-supportable housing 9 having a contoured handle portion 9A and a bead portion 9B. As will be described in greater detail hereinafter, head portion 9B encloses electro-optical components which are used to generate and project a visible laser beam through a light transmissive window 10, and to repeatedly scan the projected laser beam across a scan field 11 defined external to the hand-supportable housing.

Figure 13:
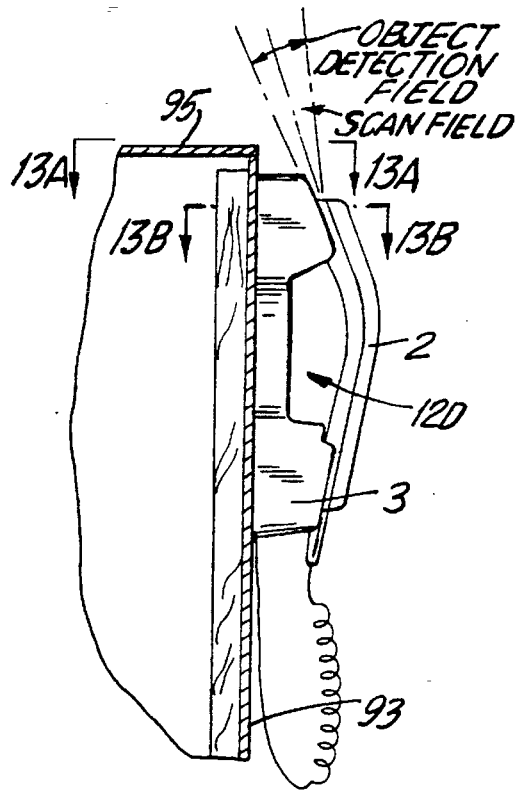
FIG. 13 is an elevated side view of the automatic bar code symbol reading system of the present invention, shown mounted onto the vertical counter wall surface of FIGS. 12A and 12B.
Figure 15A:
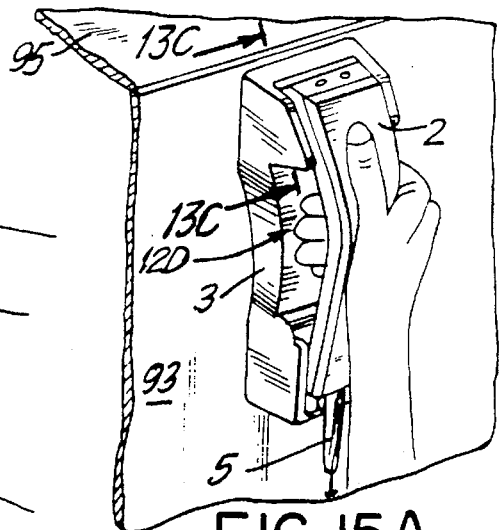
FIGS. 15A and 15B are perspective views showing the scanner support stand mounted on a vertical counter wall surface, and the automatic hand-supportable bar code symbol reading device being used in its automatic hand-held short-range mode of operation.

As illustrated in FIGS. 1 through 1C, scanner support stand 3 includes a support frame 12 which comprises a base portion 12A, a head portion support structure 12B, handle portion support structure 12C and a finger accommodating recess 12D. As shown, base portion 12A has a longitudinal extent and is adapted for selective positioning with respect to a support surface, e.g. countertop surface, counter wall surface, etc. Head portion support structure 12B is operably associated with base portion 12A, for receiving and supporting the head portion of the hand-supportable bar code reading device. Similarly, handle portion support structure 12C is operably associated with base portion 12A, for receiving and supporting the handle portion of the hand-supportable bar code symbol reading device. In order that the user's hand can completely grasp the handle portion of the hand-supportable bar code reading device, that is prior to removing it off and away from the scanner support stand as illustrated in FIGS. 1, 13 and 15A, finger accommodating recess 12D is disposed between head and handle portion support structures 12B and 12C and above base portion 12A of the support frame. In this way, finger accommodating recess 12D is laterally accessible as shown in FIG. 13 so that when the handle and head portions 9A and 9B are received within and supported by handle portion support structure 12B and head portion support structure 12C, respectively, the fingers of a user's hand can be easily inserted through finger accommodating recess 12D and completely encircle the handle portion of the hand-supportable device, as illustrated in FIG. 15A.

A more detailed description of the structure, functions and operation of the scanner support stand of the present invention will be provided hereinafter referring to FIGS. 10 through 16B. However, referring to FIGS. 1 and 10 through 13, attention will be first accorded to the illustrative embodiment of the automatic hand-supportable bar code reading device of the invention.

Figure 2A:
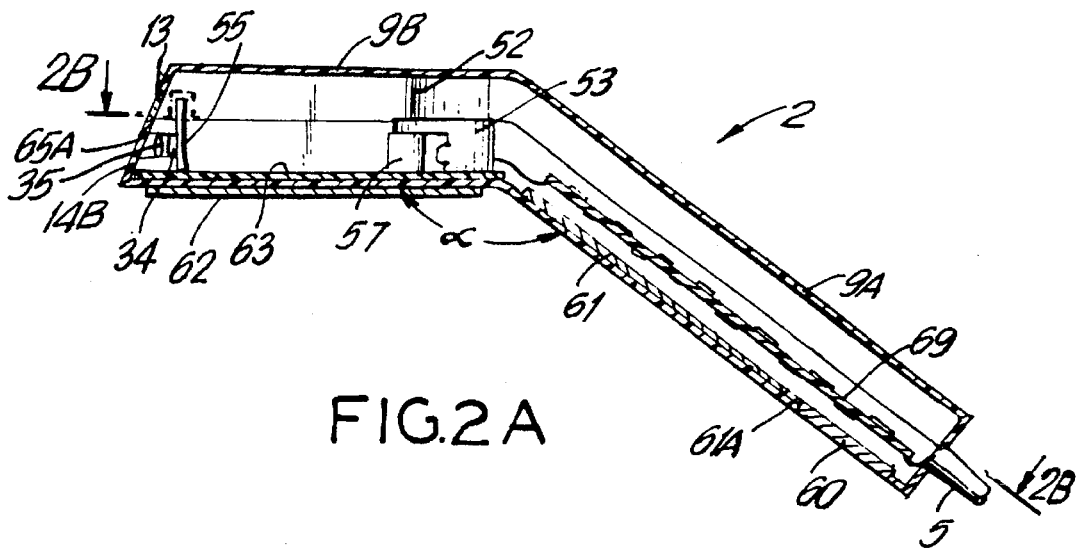
FIG. 2A is a elevated, cross-sectional side view taken along the longitudinal extent of the automatic bar code symbol reading device of FIG. 2, showing various hardware and software components utilized in realizing the illustrative embodiment Of the automatic hand-supportable bar Code symbol reading device of the present invention.
Figure 2B:
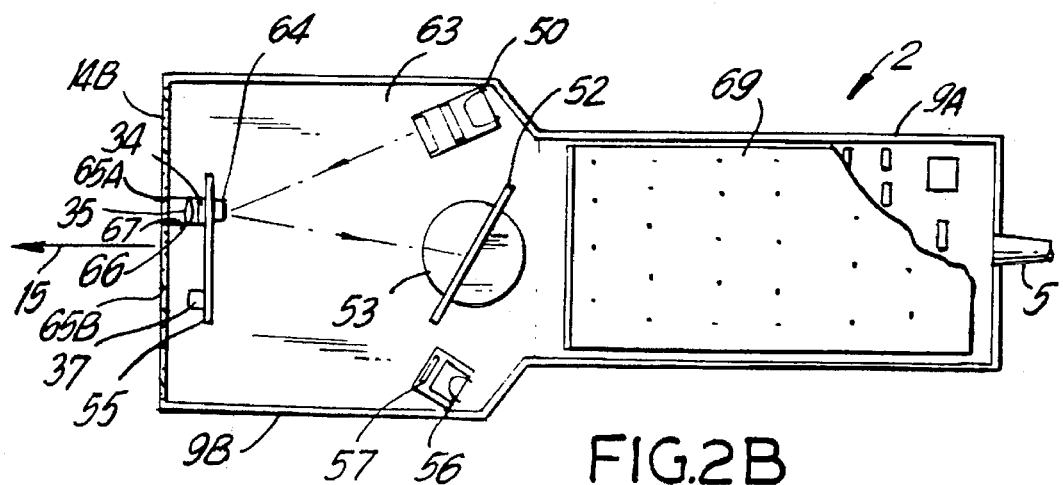
FIG. 2B, is a cross-sectional plan view taken along line 2B—2B of FIG. 2A, showings the various components used in realizing the illustrative embodiment of the automatic bar code symbol reading device.

As illustrated in FIGS. 2 through 2B in particular, head portion 9B continuously extends into contoured handle portion 9A at an obtuse angle α which, in the illustrative embodiment, is about 146 degrees. It is understood, however, that in other embodiments obtuse angle α may be in the range of about 135 to about 180 degrees. As this ergonomic housing design is sculpted (i.e. form-fitted) to the human hand, automatic hands-on scanning is rendered as easy and effortless as waving ones hand. Also, this ergonomic housing design eliminates the risks of musculoskeletal disorders, such as carpal tunnel syndrome, which can result from repeated biomechanical stress commonly associated with pointing prior art gun-shaped scanners at bar code symbols, squeezing a trigger to activate the laser scanning beam, and then releasing the trigger.

As illustrated in FIGS. 2 through 3A, the head portion of housing 9 has a transmission aperture 13 formed in upper portion of front panel 14A, to permit visible laser light to exit and enter the housing, as will be described in greater detail hereinafter. The lower portion of front panel 14B is optically opaque, as are all other surfaces of the hand-supportable housing.

As illustrated in FIGS. 2, 3 and 3A in particular, automatic hand-supportable bar code reading device 2 generates two different fields external to the hand-supportable housing, in order to carry out automatic bar code symbol reading according to the principles of the present invention. The first field, referred to as the "object detection field", indicated by broken and dotted lines, is provided externally to the housing for detecting energy reflected off an object bearing a bar code symbol, located within the object detection field. The second field, referred to as the "scan field", having at least one laser beam scanning plane is provided external to the housing for scanning a bar code symbol on an object in the object detection field. In the preferred embodiment, such scanning is achieved with a visible laser beam which produces laser scan data which is collected for the purpose of detecting the presence of a bar code symbol within the scan field, and subsequently reading (i.e. scanning and decoding) the detected bar code symbol.

In general, detected energy reflected from an object during object detection, can be optical radiation or acoustical energy, either sensible or non-sensible by the user, and may be either generated from the automatic bar code reading device or an external ambient source. As will be described in greater detail hereinafter, the provision of such energy is preferably achieved by transmitting a wide beam of pulsed infrared light away from transmission aperture 13 and substantially parallel to longitudinal axis 15 of the head portion of the hand-supportable housing. In the preferred embodiment, the object detection field, from which such reflected energy is collected, is designed to have a narrowly divirging pencil-like geometry of three-dimensional volumetric expanse, which is spatially coincident with at least a portion of the transmitted infrared light beam. This feature of the present invention ensures that an object residing within the object detection field will be illuminated by the infrared light beam, and that infrared light reflected therefrom will be directed generally towards the transmission aperture of the housing where it can be automatically detected to indicate the presence of the object within the object detection field. In response, a visible laser beam is automatically generated within the head portion of the housing, projected through the transmission aperture and repeatedly scanned across the scan field, within which at least a portion of the detected object lies. At least a portion of the scanned laser light beam will be scattered and reflected off the object and directed back towards and through light transmissive window 10 for collection and detection within the head portion of the housing, and subsequently processed in a manner which will be described in detail hereinafter.

To ensure that the user can quickly align the visible laser beam with bar code symbol on the detected object, the object detection field is designed to spatially encompass at least a portion of the scan field along the operative scanning range of the device, as illustrated in FIGS. 3 and 3A. This structural feature of the present invention provides the user with an increased degree of control, as once an object is detected, minimal time will be required by the user to point the visible laser beam towards the bar code symbol for scanning. In effect, the laser beam pointing efficiency of the device is markedly improved during the automatic bar code reading process, as it is significantly easier for the user to align the laser beam across the bar code symbol upon object detection.

To more fully appreciate the mechanisms employed in order to generate the object detection and scan fields of automatic bar code reading device of the present invention, reference is best made to the operative elements contained within the hand-supportable housing of the device.

Figure 4:
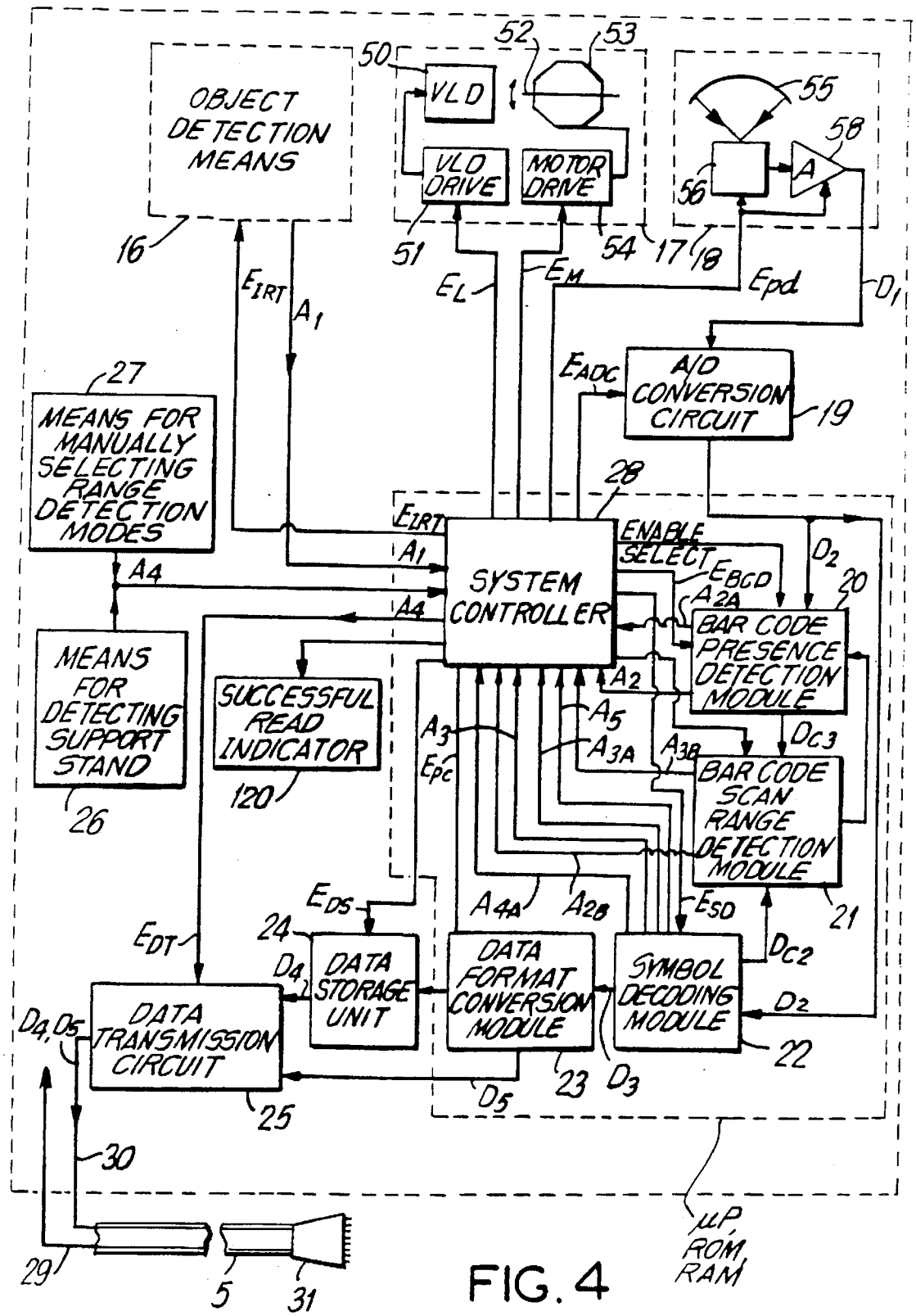
FIG. 4 is a system block functional diagram of the automatic hand-supportable bar code symbol reading device of the present invention, illustrating the principal component integrated with the system controller thereof.

As shown in FIG. 4, automatic bar code reading device 2 comprises a number of system components, namely, an object detection circuit 16, laser scanning mechanism 17, photoreceiving circuit 18, analog-to-digital (A/D) conversion circuit 19, bar code presence detection module 20, bar code scan range detection module 21, symbol decoding module 22, data format conversion module 23, symbol character data storage unit 24, and data transmission circuit 25. In addition, a magnetic field sensing circuit 26 is provided for detecting scanner support stand 3, while a manual switch 27 is provided for selecting long or short-range modes of object detection, bar code presence detection and/or bar code symbol reading, which will be described in great detail hereinafter. As illustrated, these components are operably associated with a programmable system controller 28 which provides a great degree of versatility in system control, capability and operation. The structure, function and advantages of this system controller will become apparent hereinafter.

In the illustrated embodiment, system controller 28, bar code presence detection module 20, bar code scan range detection module 21, symbol decoding module 22, and data format conversion module 23 are realized using a single programmable device, such as a microprocessor having accessible program and buffer memory, and external timing circuitry. It is understood, however, that any of these elements may be realized using separate discrete components as will be readily apparent to those with ordinary skill in the art.

Automatic hand-supportable bar code reading device 2 also includes power receiving lines 29 which lead to conventional power distribution circuitry (not shown) for providing requisite power to each of the system components, when and for time prescribed by the system controller. As illustrated, power receiving lines 29 run alongside data communication lines 30 and are physically associated with multi-pin connector plug 31 at the end of flexible scanner cable 5. An on/off power switch or functionally equivalent device (not shown) may be provided external the hand-supportable housing to permit the user to selectively energize and deenergize the device. In the illustrative embodiment, power delivered through flexible scanner cable 5 to the bar code symbol reading device is continuously provided to system controller 28 so as to continuously enable its operation, while only biasing voltages and the like are provided to all other system components. In this way, each system component must be activated (i.e. enabled) by the system controller in accordance with its preprogrammed system control routine.

Figure 5:
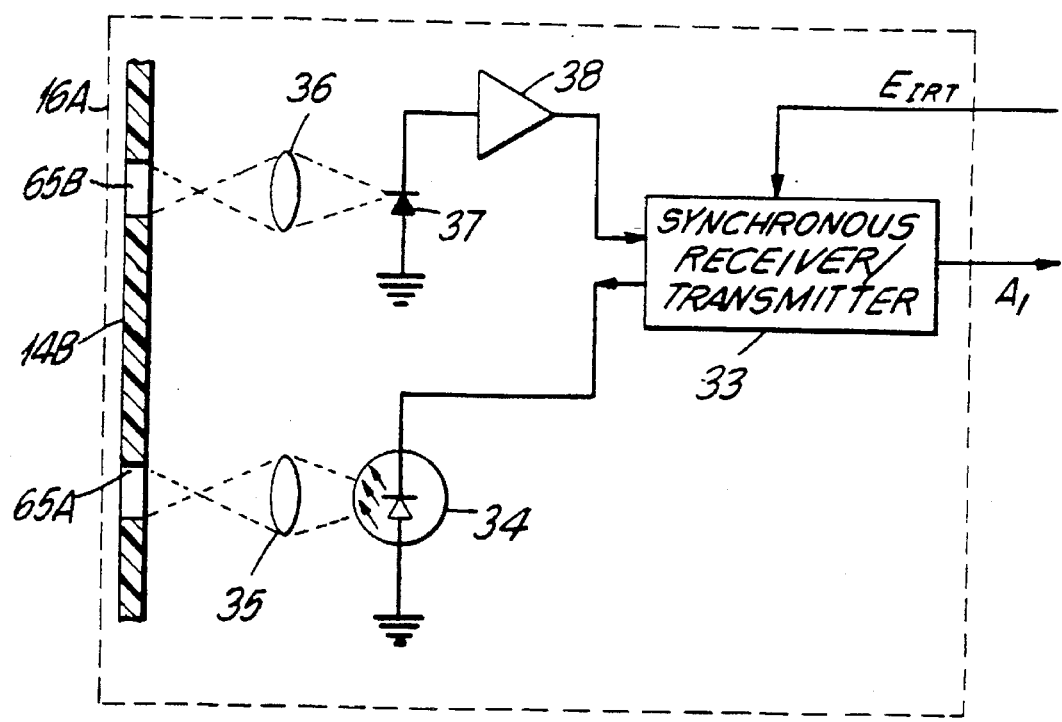
FIG. 5 is a block functional diagram of a first embodiment of the object detection mechanism for the automatic hand-supportable bar code symbol reading device of the present invention.
Figure 6:
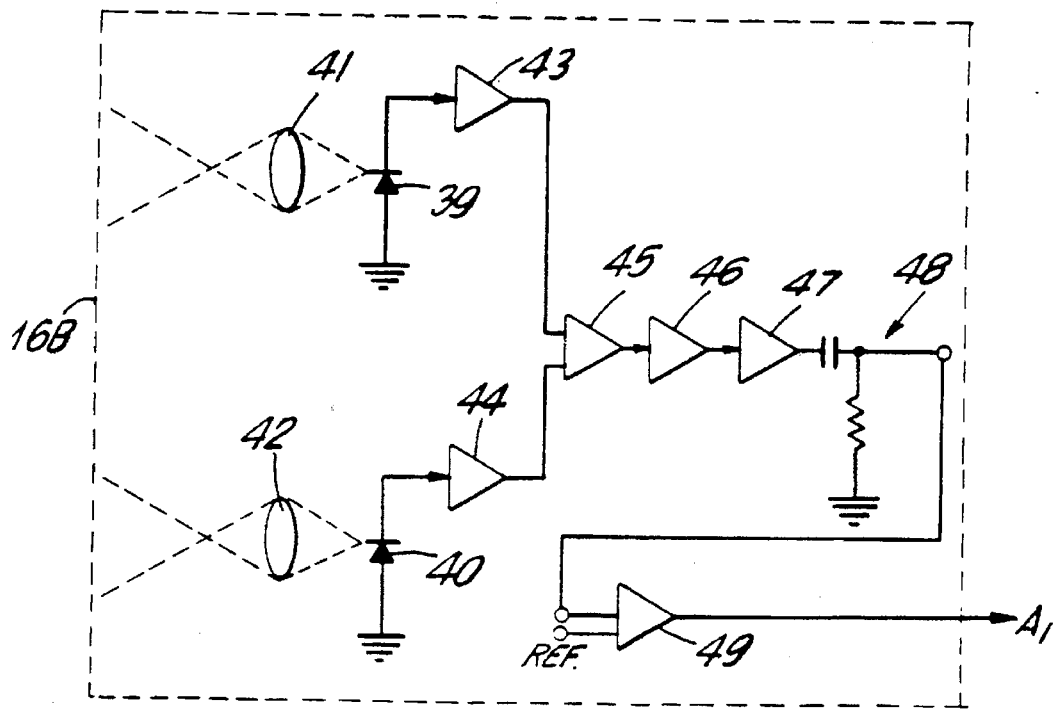
FIG. 6 is a block functional diagram of a second embodiment of the object detection mechanism for the automatic hand-supportable bar code symbol reading device of the present invention.

In accordance with the present invention, the purpose of the object detection circuit is to determine whether an object (e.g., product, document, etc.) is present or absent from the object detection field over particular time intervals specified by the system controller. When an object is detected within the object detection field, the object detection circuit produces first control activation signal $A_1=1$, which like all control activation signals, is provided as input to system controller 28. As will be described in greater detail hereinafter, depending on the particular stage of the system control process, the system controller will respond to this event by causing the bar code reading device to undergo a transition from the object detection state to the bar code symbol (presence) detection state. In FIGS. 5 and 6, two different techniques are disclosed for detecting the presence of an object within the object detection field.

In FIG. 5, an "active" object detection circuit 16A is shown. In essence, this circuit operates by transmitting a pulsed infrared (IR) light signal forwardly into the object detection field. First control activation signal $A_1$ is generated upon receiving a reflection of the transmitted signal from an object residing within the object detection field. As illustrated, object detection circuit 16A is realized as an IR sensing circuit which comprises a synchronous receiver/transmitter 33 and an infrared LED 34 which generates a 940 nanometer pulsed signal at a rate of 15.0 KHZ. This pulsed IR signal is transmitted through focusing lens 35 to illuminate the object detection field. When an object is present within the object detection field, a reflected IR pulse signal is produced from the surface of the object, spatially filtered by aperture stop 65B and focused through focusing lens 36 onto photodiode 37. Notably, (i) selection of the optical characteristics of aperture stop 65B and lens 36 and (ii) the placement of photodiode 37 (with integrally formed lens 36) behind aperture stop 65B directly determine the geometric characteristics of the object detection field. Consequently, these optical parameters are selected so as to provide an object detection field which, as hereinbefore explained, spatially encompasses at least a portion of the scanning field along the operative scanning range of the device. As illustrated in FIG. 5, the output of photodiode 37 is converted to a voltage by current-to-voltage amplifier 38, and the output thereof is provided as input to synchronous receiver/transmitter 33 which synchronously compares the received IR signal with the transmitted IR signal to determine whether an object is present in or absent from the object detection field. If the object is present in the object detection field, then synchronous receiver/transmitter 33 produces first control activation signal $A_1=1$, indicative of this condition. Upon generation of first control activation signal $A_1=1$, the system controller activates the operation of laser scanning mechanism 17, photoreceiving circuit 18, A/D conversion circuit 19, and bar code presence detection module 20 according to a preprogrammed system control routine, the details of which will be described hereinafter.

In FIG. 6, a "passive" object detection circuit 16B is shown. In essence this circuit operates by passively detecting ambient light within the object detection field. First control activation signal $A_1$ is generated upon receiving light of different intensity reflected off an object within the object detection field. As illustrated object detection circuit 16B is realized as a passive ambient light detection circuit which comprises a pair of photodiodes 39 and 40, that sense ambient light gathered from two spatially overlapping parts of the object detection field using focussing lenses 41 and 42, respectively. Notably, the optical characteristics of focusing lenses 41 and 42 and the placement of photodiodes 39 and 40 relative to lenses 41 and 42, will collectively determine the geometric characteristics of the object detection field. Consequently, these optical parameters will be selected to provide an object detection field which spatially encompasses at least a portion of the scanning field along the operative scanning range of the device. The output signals of photodiodes 39 and 40 are converted to voltages by current-to-voltage amplifiers 43 and 44 respectively, and are provided as input to a differential amplifier 45. The output of differential amplifier 45 is provided as input to a sample and hold amplifier 46 in order to reject 60 Hz and 120 Hz noise. Output signal of amplifier 46 is provided as input to a logarithmic amplifier 47 to compand signal swing. The output signal of logarithmic amplifier 47 is provided as input to a differentiator 48 and then to a comparator 49. The output of comparator 49 provides first control activation signal $A_1$. When an object is present in the object detection field, the output of computer 49 provides control activation signal $A_1=1$.

Alternatively, the automatic bar code reading device of the present invention can be readily adapted to sense ultrasonic energy reflected off an object present within the object detection field. In such an alternative embodiment, the object detection circuit of the present invention is realized as an ultrasonic energy transmitting/receiving mechanism. In the head portion of hand-supportable housing 9, ultrasonic energy is generated and transmitted forwardly of the housing head portion into the object detection field. Then, ultrasonic energy reflected off an object within the object detection field is detected closely adjacent the transmission window using an ultrasonic energy detector. Preferably, a focusing element is disposed in front of the detector in order to effectively maximize the collection of reflected ultrasonic energy. In such instances, the focusing element essentially determines the geometrical characteristics of the object detection field of the device. Consequently, as with the other above-described object detection circuits, the energy focusing (i.e. collecting) characteristics of the focusing element will be selected to provide an object detection field which spatially encompasses at least a portion of the scan field.

For purposes of illustration, object detection circuit 16A shown in FIG. 5, is provided with two different modes of detection, namely, a long-range mode of object detection and a short-range mode of object detection. As shown in FIG. 4, these modes are set by the system controller using mode enable signals $E_{IRT}=0$ and $E_{IRT}=1$, respectively. When induced into the long-range mode of object detection, the IR sensing circuit will generate first control activation signal $A_1=1$ whenever an object has been detected within the operative range of the object detection field, independent of the particular distance at which the object resides from the transmissive window. When induced into the short-range mode of object detection, the IR sensing circuit will generate first activation control signal $A_1=1$ only when an object is detected at a distance within the short-range of the object detection field.

As schematically indicated in FIGS. 3 and 3A, the long-range specification for object detection is preferrably preselected to be the full or entire range of sensitivity provided by IR sensing circuit 16A (e.g. 0 to about 10 inches). Preferrably, the short-range specification for object detection is preselected to be the reduced range of sensitivity provided by the IR sensing circuit when mode enable signal $E_{IRT}=1$ is provided to the desensitization port of synchronous receiver transmitter 33. In the illustrated embodiment, the short-range of object detection is about 0 to about 3 inches or so to provide CCD-like scanner emulation. As will become apparent hereinafter, the inherently limited depth and width of field associated with the short-range mode of object detection prevents laser scanning mechanism 17 from flooding the scan field with laser scanning light and thus inadvertently detecting undesired bar code symbols. Particular uses to which object detection range selection can be put, will be described in greater detail hereinafter with reference to FIGS. 11A through 16B in particular.

As illustrated in FIG. 4, laser scanning mechanism 17 comprises a light source 50 which, in general, may be any source of intense light suitably selected for maximizing the reflectively from the object's surface bearing the bar code symbol. In the illustrative embodiment, light source 50 comprises a solid-state visible laser diode (VLD) which is driven by a conventional driver circuit 51. The wavelength of visible laser light produced from the laser diode is preferably about 670 nanometers. In order to repeatedly scan the produced laser beam over a scan field having a predetermined spatial extent in front of the head portion of the housing as illustrated in FIGS. 3 and 3A, a planar scanning mirror 52 is oscillated back and forth by a stepper motor 53 driven by a conventional driver circuit 54. However, one of a variety of conventional laser scanning mechanisms may be alternatively used with excellent results.

To selectively activate laser light source 50 and scanning motor 53, the system controller provides laser diode enable signal $E_L$ and scanning motor enable signal $E_M$ as input to driver circuits 51 and 54, respectively. When enable signal $E_L$ is a logical "high" level (i.e., $E_L=1$) a laser beam is generated and projected through the light transmissive window 10 and when $E_M$ is a logical high level the laser beam is repeatedly scanned across the scan field.

When a bar code symbol on an object is within the scan field at the time of scanning, the incident laser light on the bar code will be scattered and reflected. This scattering/reflection process produces a laser light return signal of variable intensity which represents a spatial variation of light reflectivity characteristic of the spaced apart pattern of bars comprising the bar code symbol. Photoreceiving circuit 18 detects at least a portion of the reflected laser light of variable intensity. Upon detection of this reflected laser light, photoreceiving circuit 18 produces an analog scan data signal $D_1$ indicative of the detected light intensity.

In the illustrative embodiment, photoreceiving circuit 18 generally comprises laser light collection optics 55, which focus reflected laser light for subsequent detection by a photoreceiver 56 having, mounted in front of its sensor, a frequency selective filter 57 which only transmits optical radiation of wavelengths up to a small band above 670 nanometers. Photoreceiver 56, in turn, produces an analog signal which is subsequently amplified by preamplifier 58 to produce analog scan data signal $D_1$. In combination, laser scanning mechanism 17 and photoreceiving circuit 18 cooperate to generate analog scan data signals $D_1$ from the scan field, over time intervals specified by the system controller. As will illustrated hereinafter, these scan data signals are used by bar code presence detection module 20, bar code scan range detection module 21, and symbol decoding module 22 to perform particular functions.

As illustrated in FIG. 4, analog scan data signal $D_1$ is provided as input to A/D conversion circuit 19. As is well known in the art, A/D conversion circuit 19 processes analog scan data signal $D_1$ to provide a digital scan data signal $D_2$ which resembles, in form, a pulse width modulated signal, where logical "1" signal levels represent spaces of the scanned bar code and logical "0" signal levels represent bars of the scanned bar code. A/D conversion circuit 19 can be realized by any conventional A/D circuit well known to those with ordinary skill in the art. Digitized scan data signal $D_2$ is then provided as input to bar code presence detection module 20, bar code scan range detection module 21 and symbol decoding module 22.

The purpose and function of bar code presence detection module 20 is to determine whether a bar code is present in or absent from the scan field over particular time intervals specified by the system controller. When a bar code symbol is detected in the scan field, bar code presence detection module 20 generates second-control activation signal $A_2$ (i.e., $A_2=1$) which is provided as input to the system controller, as shown in FIG. 4. Preferably, bar code presence detection module 20 is realized as a microcode program carried out by the microprocessor and associated program and buffer memory, described hereinbefore. The function of the bar code presence detection module is not to carry out a decoding process, but rather to rapidly determine whether the received scan data signals represent a bar code symbol residing within the scan field.

There are a number of ways in which to achieve bar code presence detection through a programming implementation. For example, in the preferred embodiment, bar code presence detection module 20 detects the first and second borders of the bar code symbol "envelope". This is achieved by first processing a digital scan data signal $D_2$ to produce digitial "count" and "sign" data. The digital count data is representative of the measured time interval (i.e. duration) of each signal level occurring between detected signal level transitions which occur in digitized scan data signal $D_2$. The digital sign data, on the other hand, indicates whether the signal level between detected signal level transitions is either a logical "1", representative of a space, or a logical "0", representative of a bar within a bar code symbol. Using the digital count and sign data, the bar code presence detection module identifies the first and second borders of the bar code envelope, and thereby determines whether or not the envelope of a bar code symbol is represented by the scan data collected from the scan field. When a bar code symbol envelope is detected, the bar code symbol presence detection module provides second control activation signal $A_2=1$ to the system controller. As will be described in greater detail hereinafter, second control activation signal $A_2=1$ causes the device to undergo a transition from bar code presence detection state to bar code symbol reading state.

Similar to the object detection circuit described above, the bar code presence detection module is provided with two different modes of detection, namely: a long-range mode of bar code presence detection and a short-range mode of bar code presence detection. As shown in FIG. 4, these long and short-range modes are set by the system controller using mode select enable signals $E_{BCD}=0$ and $E_{BCD}=1$, respectively. When induced into the long-range mode of detection, the bar code presence detection module will generate second control activation signal $A_2=1$ whenever the envelope of a bar code symbol has been detected, despite the particular distance the bar code is from the light transmissive window. However, when induced into the short-range mode of detection, the bar code presence detection module will generate second control activation signal $A_2=1$ only when the envelope of a bar code symbol has been detected and when the associated digital count (i.e. timing) data indicates that the detected bar code resides within the short-range portion of the scan field.

Similar to long-range specification for object detection, long-range specification for bar code presence detection is preselected to be the entire operative scanning range available to the device. In an illustrated embodiment, this range can be from about 0 to about 10 inches from the transmission aperture, depending on the optics employed in the laser scanning mechanism and the response characteristics of the photoreceiving circuit. These long and short-range specifications are schematically indicated in FIGS. 3 and 3A. In the preferred embodiment, short-range specification for bar code presence detection is preselected to be the same range selected for short-range object detection (e.g. approximately 0 to about 3 inches from the transmission aperture). As will become apparent hereinafter, the inherently limited depth and width of field associated with the short-range mode of bar code symbol detection, prevents the reading of detected bar code symbols residing outside the short-range portion of the scan field.

Unlike the bar code symbol presence detection module, the purpose and function of bar code scan range detection module 21 is not to detect the presence of a bar code symbol in the scan field, but rather to determine the range (i.e. distance) at which a detected or decoded bar code symbol resides from the light transmissive window of the housing. As will be explained in greater detail hereinafter, this data processing module operates upon digital scan data signal $D_2$ which has been previously utilized by either the bar code symbol detection module, or the symbol decoding module depending on the state of the system.

When the system is induced into its short-range mode of bar code presence detection, bar code presence detection module 20 does not automatically produce and provide second control activation signal $A_2=1$ to the system controller upon the detection of a bar code symbol in the scan field. Rather, when a bar code symbol has been detected, the bar code presence detection module first provides to the system controller, a second control activation signal $A_{2a}=1$ indicative of a detected bar code in the scan field. Then, bar code scan range detection module 21 analyzes digital count data $D_{c1}$ produced by the bar code presence detection module, to determine at what range the detected bar code symbol resides from the light transmissive window. If scan range detection module 21 determines that the detected bar code symbol is located within the prespecified short-range portion of the scan field, then it provides second control activation signal $A_{2b}=1$ to the system controller; otherwise, the scan range detection module produces second control activation signal $A_{2b}=0$. Only when both control activation signals $A_{2a}=1$ and $A_{2b}=1$ are received by the system controller in this mode, does $A_2=1$ and thus the bar code reading device caused to undergo a transition from bar code symbol presence detection state to bar code symbol reading state.

Returning to FIG. 4, the function of symbol decoding module 22 is to process, scan line by scan line, the stream of digitized scan data $D_2$, in an attempt to decode a valid bar code symbol within a predetermined time period allowed by the system controller. In general, when symbol decoding module 22 successfully decodes a bar code symbol within the predetermined time period, symbol character data $D_3$ (typically in ASCII code format) corresponding to the decoded bar code symbol is produced. Thereupon, a third control activation signal $A_3=1$ is produced by the symbol decoding module and is provided to the system controller in order to perform its system control functions.

Similar to the bar code presence detection module, the symbol decoding module is provided with two different modes of detection, namely: a long-range mode and a short-range mode of bar code symbol decoding. When the system is induced into its short-range mode of bar code symbol decoding, symbol decoding module 22 does not automatically generate third activation signal $A_3=1$ upon decoding a valid bar code symbol. Rather, when a bar code symbol has been successfully decoded, the symbol decoding unit first provides to the system controller, a third activation control signal $A_{3a}=1$, indicative of a decoded bar code symbol in the scan field. Then, bar code scan range detection module 21 analyzes digital count data $D_{c2}$ produced by the symbol decoding module, to determine at what range (i.e. distance) the decoded bar code symbol resides from the transmssion aperture. If the bar code scan range detection module determines that the decoded bar code symbol resides within the prespecified short-range portion of the scan field, then it provides third control activation signal $A_{3b}=1$ to the system controller; otherwise, bar code scan range detection module produces third control activation signal $A_{3b}=0$. Only when both control activation signals $A_{3a}=1$ and $A_{3b}=1$ are received by the system controller in this mode, does $A_3=1$ and thus bar code reading device caused to undergo a transition from the bar code symbol reading state to the symbol character data transmission/storage state.

The long-range and short-range modes of bar code symbol detection and decoding described above each require the use of bar code scan range detection to determine whether or not the detected or decoded bar code symbol resides in the short or long-range portion of the scan field. As such, the use of this scan data processing technique permits the system of the present invention to condition the occurance of particular events within the system control program. This feature of the present invention will be illustrated in great detail hereinafter when describing auxilliary system control routine of FIGS. 8A and 8B.

As will be illustrated in greater detail hereinafter with reference to FIGS. 8 and 8A, the system controller provides enable signals $E_{FC}$, $E_{DS}$ and $E_{DT}$ to data format conversion module 23, data storage unit 24 and data transmission circuit 25, respectively, at particular stages of its control program. As illustrated in FIG. 4, symbol decoding module 22 provides symbol character data $D_3$ to data format module 23 to convert data $D_3$ into two differently formatted types of symbol character data, namely $D_4$ and $D_5$. Format-converted symbol character data $D_4$ is of the "packed data" format, particularly adapted for efficient storage in data storage unit 24. Format-converted symbol character data $D_5$ is particularly adapted for data transmission to host computer system 6 (e.g. an electronic cash register). When symbol character data $D_4$ is to be converted into the format of the user's choice (based on a selected option mode), the system controller provides enable signal $E_{DS}$ to data storage unit 24, as shown in FIG. 4. Similarly, when format converted data $D_5$ is to be transmitted to host device 6, the system controller provides enable signal $E_{DT}$ to data transmission circuit 25. Thereupon, data transmission circuit 24 transmits format-converted symbol character data $D_5$ to host computer system 6, via the data transmission lines of flexible scanner connector cable 5.

In order to select either the long or short-range mode of object (and bar code range detection, the hand-supportable bar code reading device is provided with both manual and automated mechanisms for effectuating such range selections.

For example, a manual switch 27 is mounted on the top surface of the handle portion of the housing, so that long and short-range modes of object and bar code range detection can be selected by simply depressing this switch with ones thumb while handling the bar code reading device. This switch provides control activation signal $A_4=1$ to the system controller, which in turn generates the appropriate mode enable signal $E_{IRT}$.

In the illustrated embodiment, magnetic field sensing circuit 26 is operably associated with the system controller to automatically generate control activation signal $A_4=1$ when the hand-supportable bar code reading device is not supported within scanner support stand 3. As will be described in greater detail hereinafter, scanner support stand 3 includes a means for producing a magnetic field in proximity with either one of the head or handle portion support structures 12A and 12B. With this arrangement, magnetic field sensing circuit 26 generates control activation signal $A_4=1$ when the magnetic field is sensed while the hand-supportable bar code reading device is received within the scanner support stand. Additionally, a indicator light can be provided on the housing of the hand-supportable device to visually indicate the particular mode which has been manually or automatically selected.

In general, magnetic sensing circuit 26 comprises a magnetic flux detector 60, a preamplifier and a threshold detection circuit. Magnetic flux detector 60 produces as output an electrical signal representative of the intensity of detected magnetic flux density in its proximity. When housing 9 is received and supported in scanner support stand 3, as shown, for example, in FIGS. 1, 13, 15A and 15B, and 17A and 17B magnetic flux detector 60 is in position to detect magnetic flux emanating from a magnetic bar fixedly mounted within the handle portion support structure of the scanner support stand. The produced electrical signal from the magnetic flux detector is amplified by the preamplifier whose output is compared to a predetermined threshold maintained in the threshold detector circuit. If the intensity of the detected magnetic flux exceeds the threshold, long-range control activation signal $A_4=1$ is provided to the system controller.

As illustrated in FIG. 2A, magnetic flux detector 60 is mounted to the rearward underside surface of the handle portion of housing 9. In the illustrated embodiment, a ferrous bar 61 is interiorly mounted to the underside surface of the housing handle portion as shown. As will be described in greater detail hereinafter, this arrangement facilitates releasable magnetic attachment of the hand-supportable housing to the magnetic bar fixedly installed in the handle portion support structure of the scanner support stand. Preferably, a hole 61A is drilled through ferrous bar 61 to permit installation of magnetic flux detector 60 so that magnetic flux emanating from the handle portion support structure is detectable when the hand-supportable housing is placed within the scanner support stand, as shown in FIGS. 1, 13, 15A and 15B, and 17A and 17B. In this configuration, magnetic flux detector 60 is in proximity with the source of magnetic flux (i.e. magnetic bar in the scanner support stand) and thus long-range control activation signal $A_4=1$ is provided to the system controller. In response, the system controller enables long-range object detection (i.e. $E_{IRT}=0$). When the hand-supportable housing is removed from the scanner support stand as shown in FIGS. 2, 11C, 14B and 16B, the intensity of the magnetic flux from the scanner support stand is no longer sufficient in strength to produce long-range mode activation signal $A_4=1$; instead, short-range control activation signal $A_4=0$ is provided to the system controller. In response, the system controller enables short-range object detection (i.e. $E_{IRT}=1$), and the automatic hand-supportable bar code reading device emulates the operational range of a CCD scanner.

As illustrated in FIG. 2A, a thin ferrous plate 62 is exteriorly applied to the underside of the head portion of the hand-supportable housing. As will be described in greater detail hereinafter, the function of ferrous elements 61 and 62 is to provide a means by which the plastic hand-supportable housing can be magnetically attracted by magnetic elements installed within head and handle portion support structures 12B and 12C when the bar code reading device is placed in the scanner support stand.

It is understood that there are a variety of ways in which to configure the above described system components within the hand-supportable housing of the automatic bar code reading device, while successfully carrying out of functions of the present invention. In FIGS. 2A through 2D, one preferred arrangement is illustrated.

In FIG. 2A, the optical arrangement of the system components is shown. Specifically, visible laser diode 50 is mounted in the rear corner of circuit board 63 installed within the head portion of the housing. Stationary concave mirror 55 is mounted centrally at the front end of circuit board 63, primarily for the purpose of collecting laser light reflected off detected objects. Notably, the height of concave mirror 55 is such as not to block transmission aperture 13. Mounted off center onto the surface of concave mirror 55, is a very small second mirror 64 for directing the laser beam to planar mirror 52 which is connected to the motor shaft of scanning motor 53, for joint oscillatory movement therewith. As shown, scanning motor 53 is mounted centrally at the rear end of circuit board 63. In the opposite rear corner of circuit board 63, photodetector 56 and frequency selective filter 57 are mounted.

In operation, laser diode 50 adjacent the rear of the head portion produces a laser beam which is directed in a forward direction to the small stationary mirror 64 and is then reflected back to oscillating mirror 52. Oscillating mirror 52 directs the laser beam through transmission aperture 13 and light transmissive window 10, while repeatedly scanning the laser beam across the scan field. Under the control of the user, the visible laser beam is aligned with a bar code symbol on the detected object, so that the laser beam scans the bar and space pattern thereof. A portion of the scattered laser light reflected from the bar code symbol is directed back through the light transmissive window and towards oscillating mirror 52, which also acts as a light retroreflective mirror. Oscillating mirror 52 then directs the reflected laser light to stationary concave collecting mirror 55 at the forward end of the head portion of the hand-supportable housing. The laser light collected from the concave mirror 55 is then directed to photodetector 56 to produce an electrical signal representative of the detected intensity of the laser light reflected off the bar code symbol.

Figure 2C:
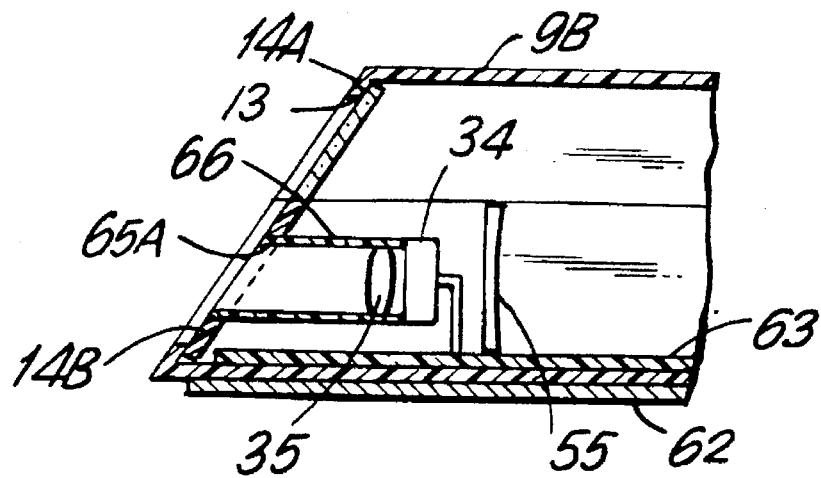
FIG. 2C, is an elevated partially fragmented cross-sectional view of the head portion of the automatic hand-supportable bar code symbol reading device of the present invention, illustrating an electro-optical arrangement utilized in transmitting pulsed infrared light signals over the object detection field of the device.
Figure 2D:
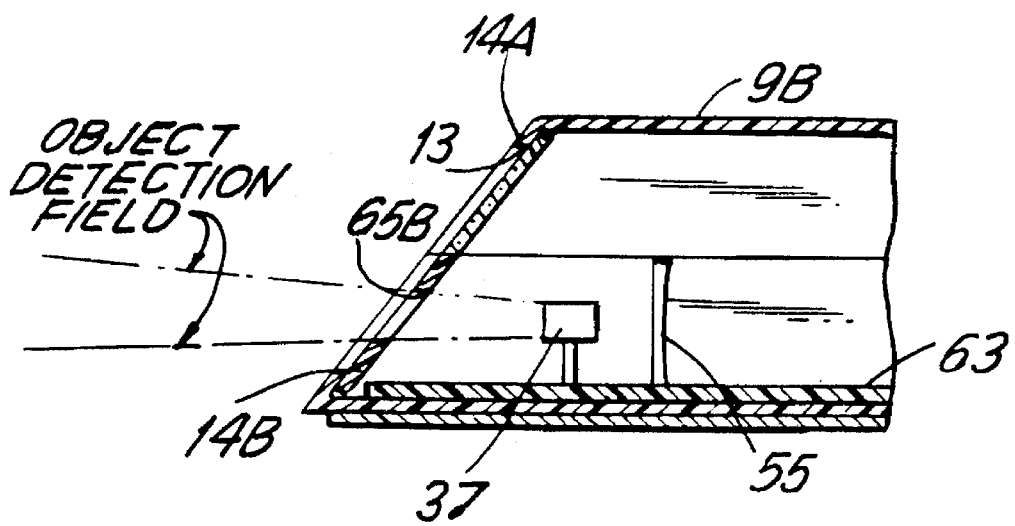
FIG. 2D,is an elevated partially fragmented cross-sectional view of the head portion of the automatic hand-supportable bar code symbol reading device of the present invention, illustrating the electro-optical arrangement utilized in producing the object detection field of the device.

As illustrated in FIG. 2C, IR LED 34 and photodiode 37 are mounted to circuit board 63, in front of stationary concave mirror 55 and in a slightly offset manner from longitudinal axis 15 of the head portion of the housing. Apertures 65A and 65B are formed in opaque housing panel 14B, below transmission aperture 13, to permit transmission and reception of pulsed IR energy signals, as hereinbefore described. In order to shield IR radiation from impinging on photodiode 37 via the housing, a metallic optical tube 66 having an aperture 67 encases photodiode 37. The dimensions of aperture 67, the placement of IR LED 34 and its radiation transmission characteristics collectively will determine the radiation pattern of the transmitted IR signal from aperture 65A in the housing. In order to collect pulsed IR radiation from the object detection field of designed geometry, photodiode 37 is located at a selected distance behind aperture stop 65B formed in opaque housing panel 14B, as shown in FIG. 2D. By selecting the dimensions of aperture stop 65B and the placement of photodiode 37 (and integrally formed lens 36) behind aperture stop 65B, the desired geometrical characteristics and the object detection field can be directly determined, as described hereinbefore.

In order to prevent optical radiation slightly below 670 nanometers from passing through transmission aperture 13 and entering the housing, light transmissive window 10 is realized as a plastic filter lens 10 is installed over the transmission aperture. This plastic filter lens has optical characteristics which transmit only optical radiation from slightly below 670 nanometers. In this way, the combination of plastic filter lens 10 at the transmission aperture and frequency selective filter 57 before photoreceiver 56 cooperate to form a narrow band-pass optical filter having a center frequency $f_c=670$ nanometers. By permitting only optical radiation associated with the visible laser beam to enter the housing, this optical arrangement provides improved signal-to-noise ratio for detected scan data signals $D_1$.

In addition to the above-described optical and electro-optical components, circuit board 63 carries all other electronic components and associated circuitry used in realizing IR object detection circuit 16A, scanning mechanism 17, photoreceiving circuit 18, and A/D conversion 19. With respect to the other system components, a second circuit board 69 is mounted within the handle portion of the housing, as shown in FIGS. 2A and 2B. The function of Circuit board 69 is to carry electronic components and assocciated circuitry used in realizing bar code presence detection module 20, bar code scan range detection module 21, symbol decoding module 22, data format conversion module 23, data storage unit 24, data transmission circuit 25, magnetic field detection circuit 26, manual range/mode selection switch 27, and system controller 28. All conductors associated with flexible multiwire scanner cable 5 are electrically connected to circuit board 69 in a manner well known in the art. Electrical communication between circuit boards 63 and 69 is realized using a plurality of electrical wires jumping across these circuit boards.

Having described the detailed structure and internal functions of the automatic bar code reading device of the illustrative embodiment, the operation of its system controller will now be described with reference to system block diagram shown in FIG. 4, and to Blocks A to CC shown in FIGS. 7A to 7D.

Beginning at the START block of Main System Control Routine of FIG. 7 and proceeding to Block A, bar code reading device 2 is initialized. This involves activating (i.e. enabling) IR sensing circuit 16A and the system controller. The system controller, on the other hand, deactivates (i.e. disables) the remainder of activatable system components, e.g. laser diode 50, scanning motor 53, photoreceiving circuit 18, A/D conversion circuit 19, bar code presence detection module 20, bar code scan data range detection module 21, symbol decoding module 22, data format conversion module 23, data storage unit 24, and data transmission circuit 25. All timers $T_1$, $T_2$, $T_3$, $T_4$ and $T_5$ (not shown) maintained by the system controller are reset to t=0 seconds.

Proceeding to Block B, the system controller checks to determine whether control activation signal $A_1=1$ is received from IR sensing circuit 16A. If this signal is not received, then the system controller returns to the START block. If signal $A_1=1$ is received, indicative that an object has been detected within the object detection field, then the system controller proceeds to Block C, at which timer $T_1$ is started and is permitted to run for a preset time period, e.g. $0 \leq T_1$, $\leq 3$ seconds, and timer $T_2$ is started and permitted to run for a preset time period $0 \leq T_2$ 5 seconds.

Proceeding to Block D in FIG. 7, the system controller activates laser diode 50, scanning motor 53, photoreceiving circuit 18, A/D conversion circuit 19 and bar code presence detection module 20 in order to collect and analyze scan data signals $D_2$ for the purpose of determining whether or not a bar code is within the scan field. Then at Block E FIG. 7A, the system controller checks to determine whether control activation signal $A_2=1$ is received from bar code presence detection module 20 within time period $1 \leq T_1 3$ seconds. If activation control signal $A_2=1$, is not received within this period, then the system controller proceeds to Block F. At Block F, the system controller deactivates laser diode 50, scanning motor 53, photoreceiving circuit 18, A/D conversion circuit 19 and bar code presence detection module 20. Then the system controller remains at Block G until it receives control activation signal $A_1=0$ from IR sensing circuit 16A, indicative that the object is no longer in the object detection field. When this condition exists, the system controller returns to the START block.

If, however, the system controller receives control activation signal $A_2=1$ within time period $0 \leq T_1 \leq 3$ seconds, indicative that a bar code has been detected, then the system controller proceeds to Block H. As will be described hereinafter, this represents a transition from the bar code presence detection state to the bar code symbol reading state.

Proceeding to Block H, the system controller continues activation of laser diode 40, scanning motor 53, photoreceiving circuit 18, and A/D conversion circuit 19, while commencing activation of symbol decoding module 20. At this stage, fresh bar code scan data is collected and subjected to decode data processing. At essentially the same time, at Block I, the system controller starts timer $T_3$ to run for a time period $0 \leq T_3 1$ second.

Figure 7A:
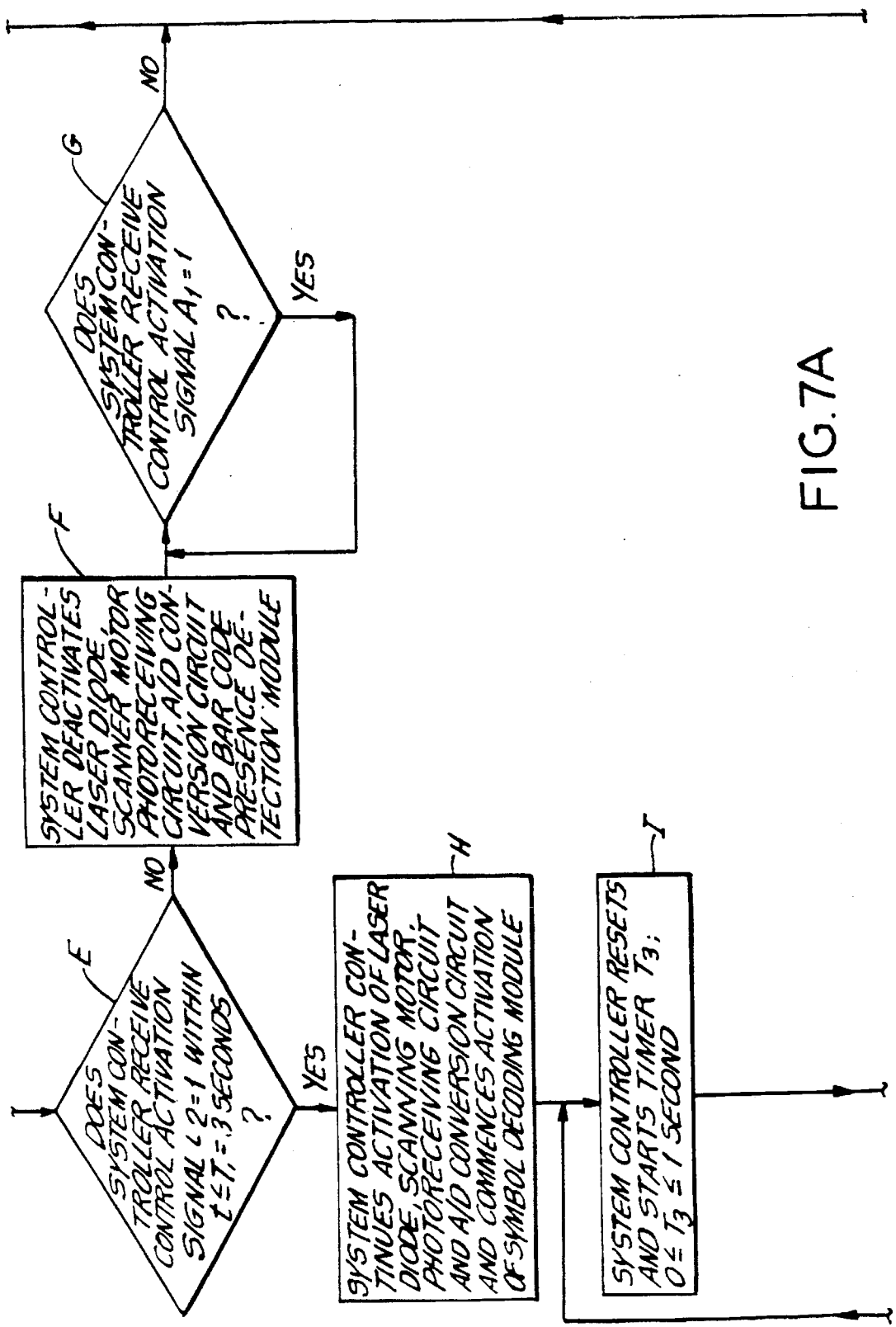
FIGS. 7A to 7D, taken together, show a high level flow chart of a system control program (i.e. Main System Control Routine) contained within the control system of the automatic bar code symbol reading device, illustrating various courses of programmed system operation that the illustrative embodiment may undergo.
Figure 7B:
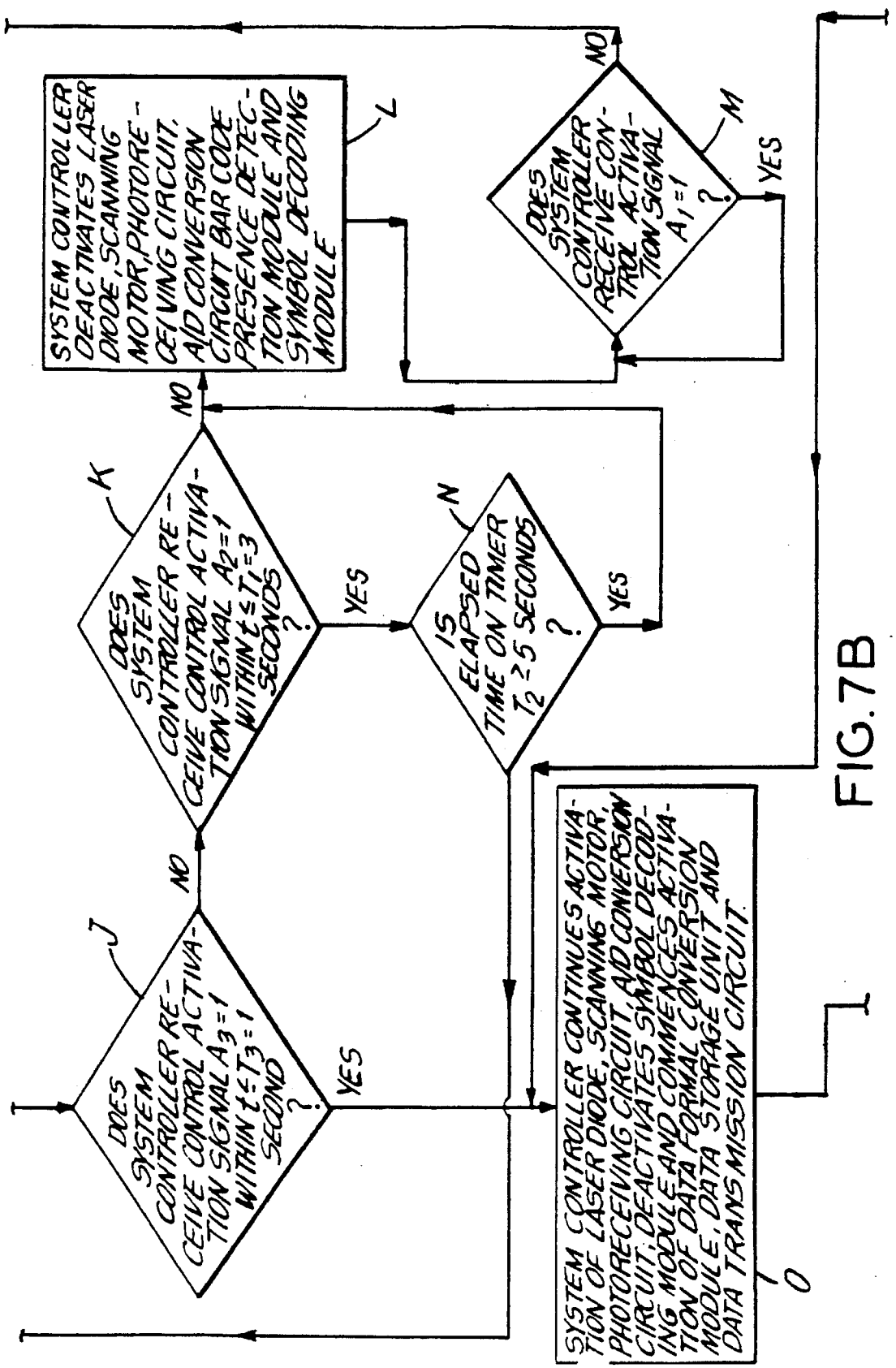

As indicated at Block J in FIG. 7B, the system controller checks to determine whether control activation signal $A_3=1$ is received from the symbol decoding module 22 within $T_3=1$ second, indicative that a bar code symbol has been successfully read (i.e. scanned and decoded) within the allotted time period. If control activation signal $A_3$ is not received within the time period $T_3=1$ second, then at Block K the system controller checks to determine whether control activating signal $A_2=1$ is received within time period $0 \leq T_3 \leq 3$ seconds. If a bar code symbol is not detected within this time period, then the system controller proceeds to Block L to deactivate laser diode 50, scanning motor 53, photoreceiving circuit 18, A/D conversion circuit 19, bar code presence detection module 20 and symbol decoding module 22. Notably, this event causes a state transition from the bar code reading state to the object detection state. Thereafter, at Block M the system controller remains in the object detection state awaiting control activation signal $A_1=0$, indicative that an object is no longer in the object detection field. When this condition exists, the system controller returns to the START block, as shown.

If at Block K, however, the system controller receives control activation signal $A_2=1$, indicative that a bar code once again is within the scan field, then the system controller checks to determine whether time period $T_2$ has elapsed. If it has, then the system controller proceeds to Block L and then to the START block by way of Block M. If however time period $0 \leq T_2 5$ seconds has not elapsed, then the system controller resets timer $T_3$ to run once again for a time period $0 \leq T_3 1$ second. In essence, this provides the device at least another opportunity to read a bar code present within the scan field when the system controller is at control Block J.

Upon receiving control activation signal $A_3=1$ from symbol decoding module 29, indicative that a bar code symbol has been successfully read, the system controller proceeds to Block O. At this stage of the system control process, the system controller continues to activate laser diode 50, scanning motor 53, photoreceiving circuit 18 and A/D conversion circuit 19, while deactivating symbol decoding module 22 and commencing activation of data format conversion module 23, data storage unit 24 and data transmission circuit 25. These operations ensure repeated scanning of the laser beam across the scan field, while symbol character data is being appropriately formatted and transmitted to host computer system 6 by a conventional data communication process well known in the art.

Figure 7C:
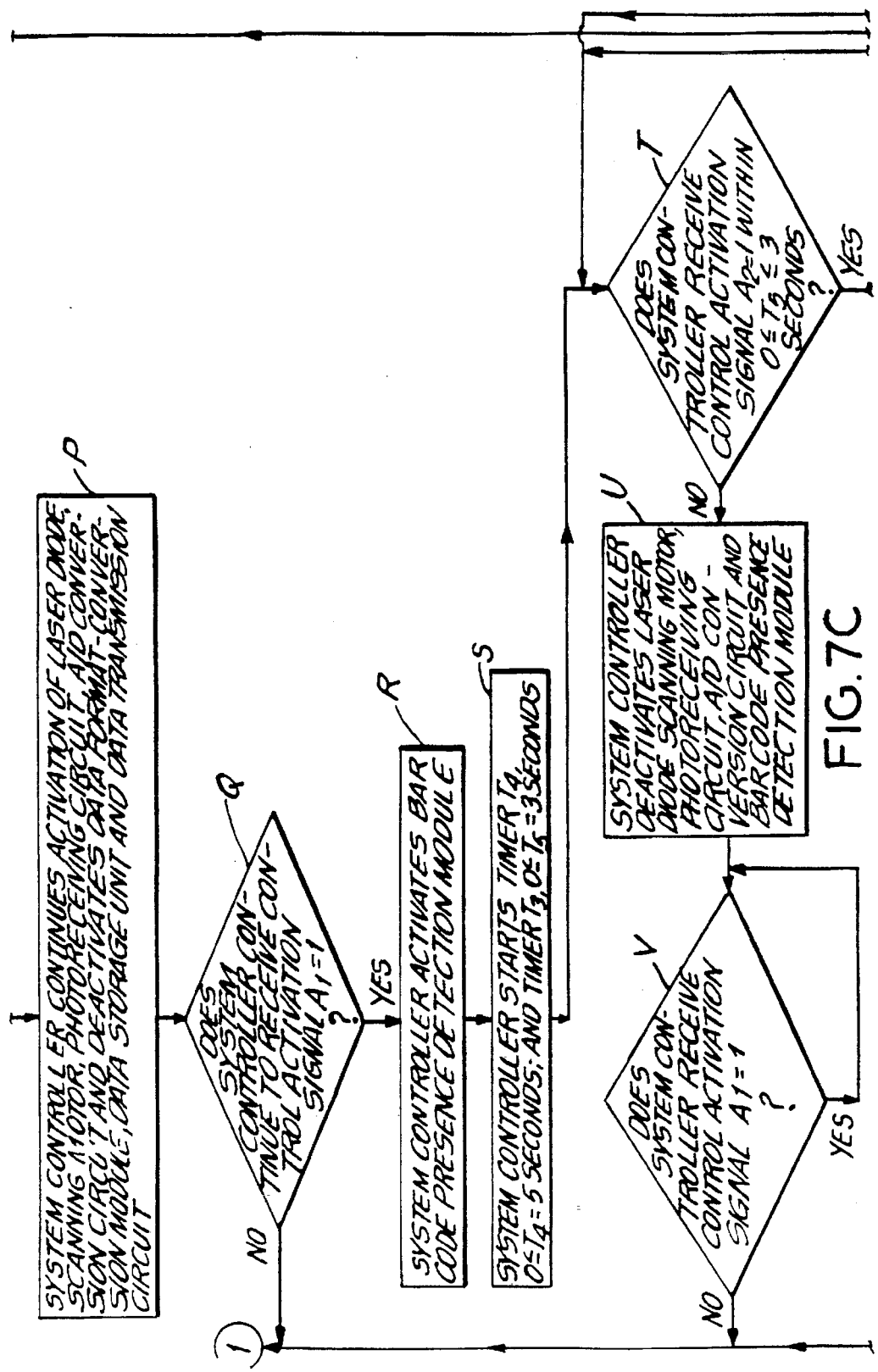

After transmission of symbol character data to the host device is completed, the system controller enters Block P in FIG. 7C and continues activation of laser diode 50, scanning motor 53, photoreceiving circuit 18 and A/D conversion circuit 19, while deactivating symbol decoding module 22, data format-conversion module 23, data storage unit 24 and data transmission circuit 25. To detect the continued presence of an object within the object detection field, the system controller checks at Block Q whether control activation signal $A_1=1$ is received from IR sensing circuit 16A. If $A_1=0$, indicative that the object is no longer in the object detection field, then the system controller returns to the START block. If control activation signal $A_1=1$ is received, then at Block R the system controller activates bar code presence detection module 20. These events represent once again a transition from the object detection state to the bar code symbol presence detection state.

At Block S, the system controller starts timer $T_4$ to run for a time period $0 \leq T_4 5$ seconds, and timer $T_5$ to run for a time period $0 \leq T_5 3$ seconds. Then to determine whether a bar code symbol has been detected within the scan field, system controller proceeds to Block T to check whether control activation signal $A_2=1$ is received. If this signal is not received with the time period $0 \leq T_5 \leq 3$ seconds, indicative that no bar code symbol is present in the scan field, the system controller proceeds to Block U, at which it deactivates laser diode 50, scanning motor 53, photoreceiving circuit 18, A/D conversion circuit 19 and bar code presence detection module 20. Thereafter, the system controller remains at Block V until the object leaves the object detection field and (i.e. receives control activation signal $A_1=0$), at which time the system controller returns to the START block, as shown.

Figure 7D:
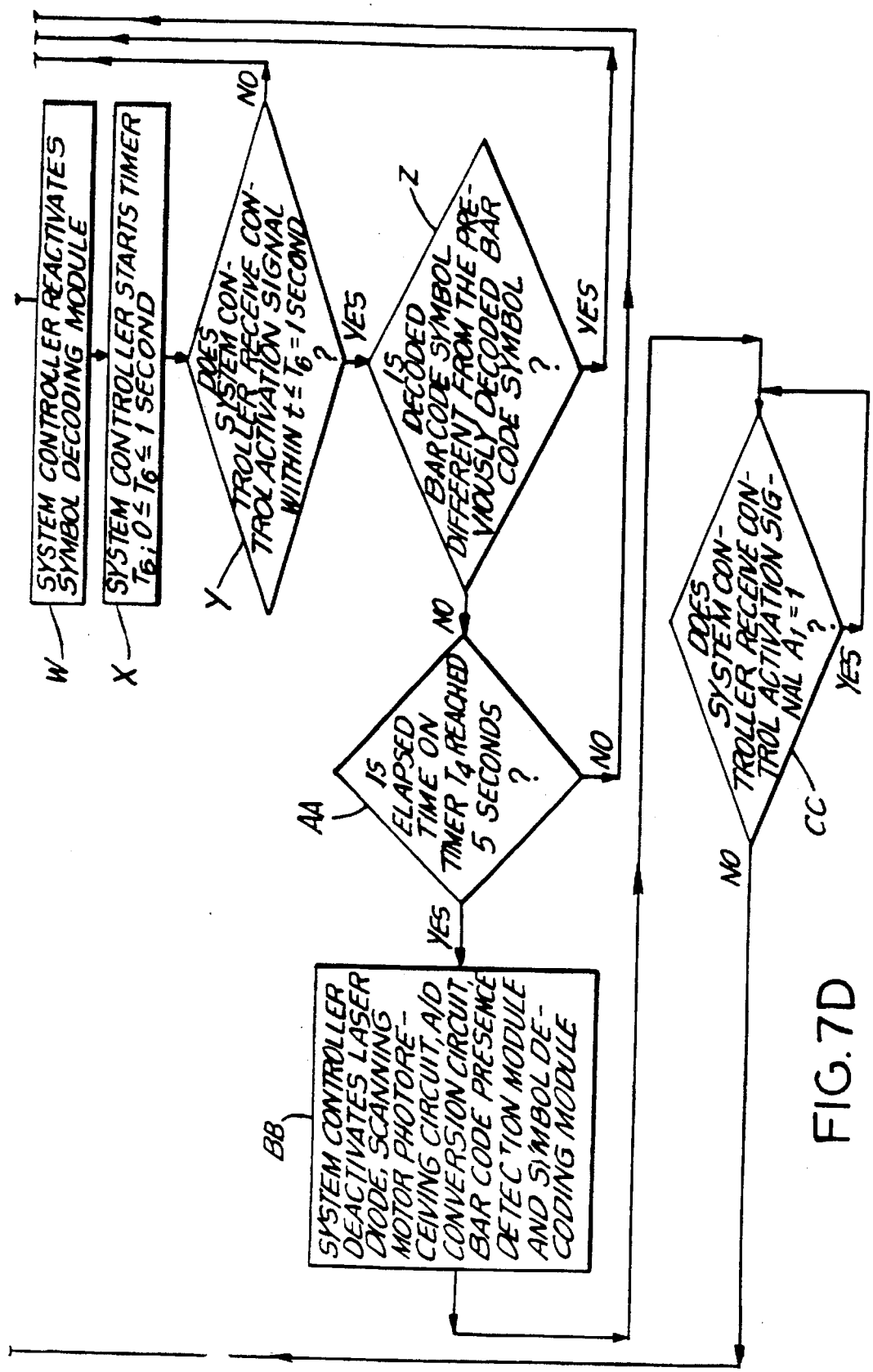

If, however, at Block T control activation signal $A_2=1$ is received, indicative that a bar code symbol has been detected in the scan field, the system controller proceeds through Blocks W and X in FIG. 7D to reactivate the symbol decoding module and start timer $T_6$ to run for a time period $0 \leq T_6 \leq 1$ second. These events represent a transition from the bar code symbol detection state to the bar code symbol reading state. At Block Y, the system controller checks to determine whether control activation signal $A_3=1$ is received from signal decoding module 22 within time period $0 \leq T_6 \leq 1$ second. If a bar code symbol is not successfully read within this 1 second time period, the system controller returns to Block T to form a first loop, within which the device is permitted to detect or redetect a bar code symbol within the time period $0 \leq T_4 \leq 5$ seconds. If a bar code symbol is decoded within this time interval, the system controller determines at Block Z whether the decoded bar code symbol is different from the previously decoded bar code symbol. If it is different, then the system controller returns to Block O as illustrated, to format and transmit symbol character data as described hereinabove.

If, however, the decoded bar code symbol is not different than the previously decoded bar code symbol, then at Block AA the system controller checks to determine whether timer $T_4$ has lapsed. If it has not lapsed, the system controller returns to Block T to form a second loop, within which the device is permitted to detect or redetect a bar code symbol in the scan field and then successfully read a valid bar code symbol within the set time interval $0 \leq T_4 \leq 5$ seconds. If, however, timer $T_4$ lapses, then the system controller proceeds to Block BB at which the system controller deactivates laser diode 50, scanning motor 53, photoreceiving circuit 18, A/D conversion circuit 19, bar code presence detection module 20, and symbol decoding module 22. Thereafter, the system controller remains at Block CC until control activation signal $A_1=0$ is received from IR sensing circuit 16A, indicative that the object detection field is free of any objects. At this stage, the system controller returns to the START block, as shown.

The operation of automatic hand-supportable bar code reading device 2 has been described in connection with The Main System Control Routine which uses control activation signals $A_1$, $A_2$ and $A_3$. This system control routine operates on two basic assumptions concerning IR sensing circuit 16A and bar code symbol presence detection module 20. Specifically, The Main System Control Routine assumes that the IR sensing circuit produces control activation signal $A_1=1$ whenever an object is detected anywhere, within the operative detection range of the object detection field. It also assumes that the bar code symbol presence detection module produces control activation signal $A_2=1$ whenever a bar code symbol is detected anywhere within the operative scanning range of the scan field. These assumptions cause state transitions during the operation of the automatic bar code symbol reading device, when otherwise they may not be desired in particular applications.

For example, in some applications it may not be desirable to automatically advance the bar code symbol reading device to its bar code presence detection state until an object bearing a bar code is within the short-range portion of the object detection field, as hereinbefore described. Also, it may not be desirable to automatically advance to the bar code symbol reading state until a detected bar code symbol is located within the short-range portion of the scan field. Also, it may not be desirable to automatically advance to the symbol character data storage/transmission state until a decoded bar code symbol is located within the short-range portion of the scan field. Thus, in some instances, it may be desirable to condition transition from (i) object detection to the bar code symbol detection state, (ii) the bar code symbol detection state to the bar code symbol reading state, and (iii) the bar code symbol reading state to the symbol character data storage/transmission state. Yet, in other instances, it may only be desirable to condition only one or two of these state transitions.

Figure 8:
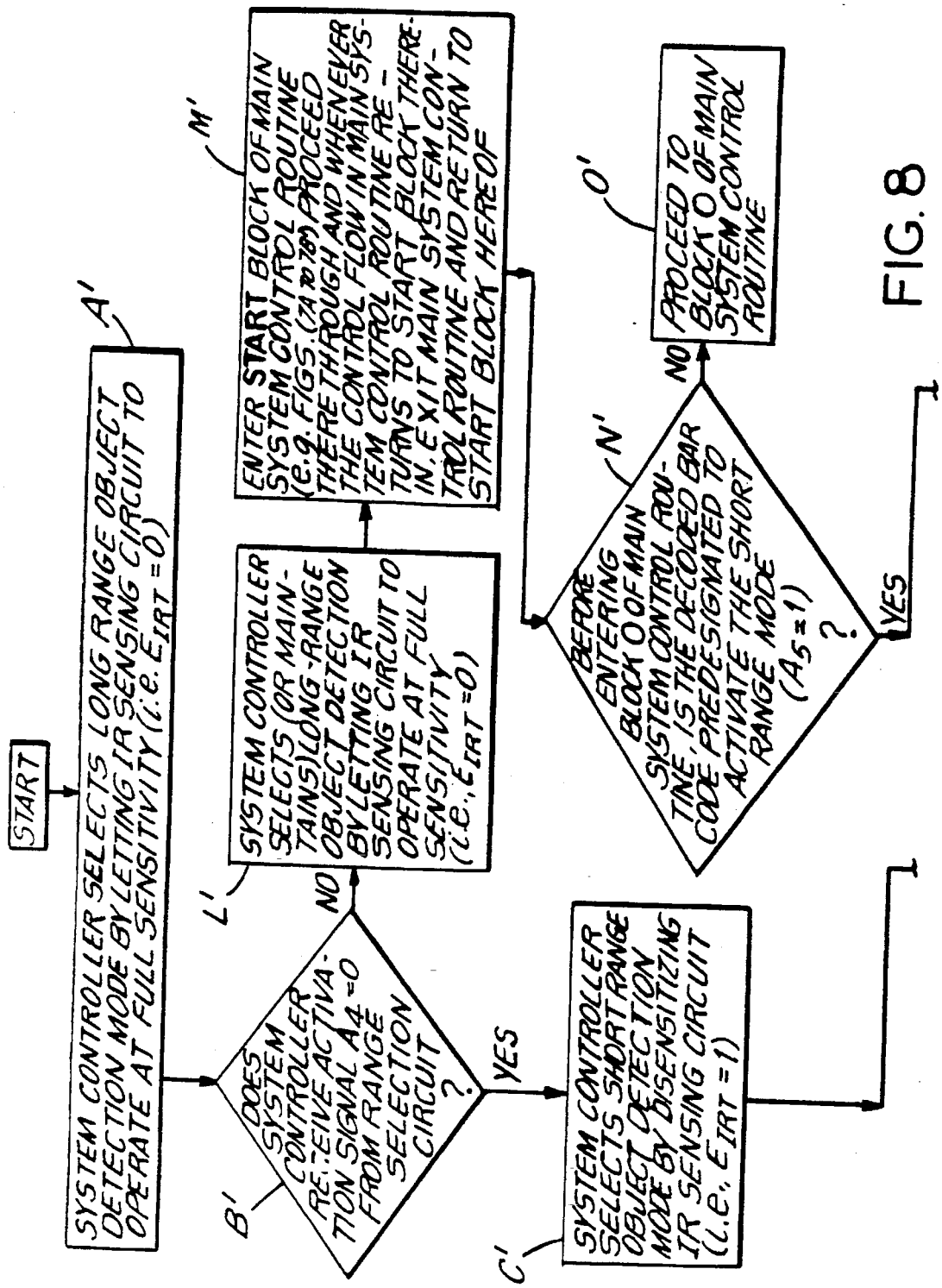
FIGS. 8A to 8D, taken together, show a high level flow chart of an auxilliary system control program (i.e. Auxilliary System Control Routine with Range Selection), which provides the hand-supportable automatic bar code symbol reading device of the present invention with several selectable modes of object detection, bar code presence detection and bar code symbol reading.
Figure 8A:
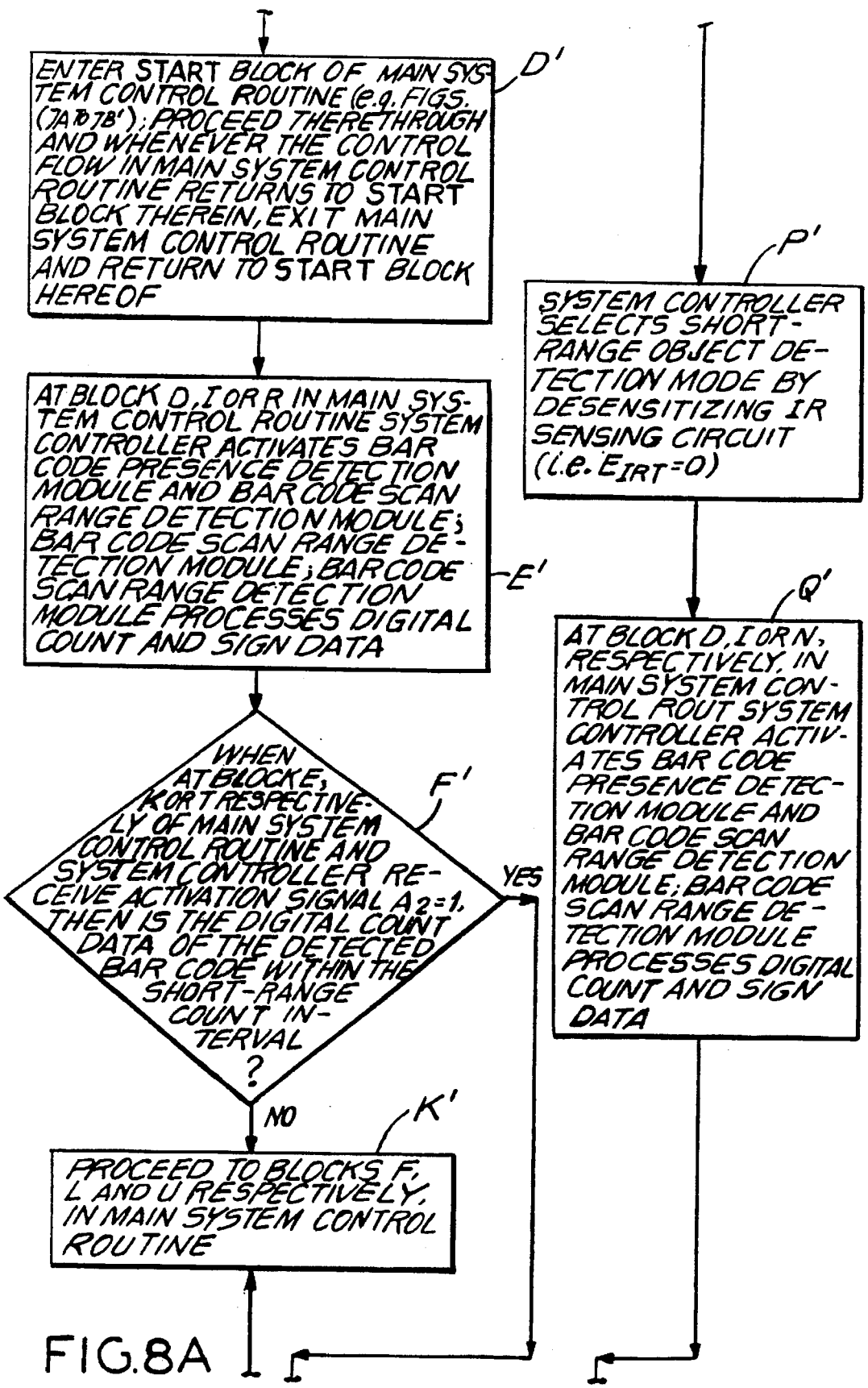
Figure 8B:
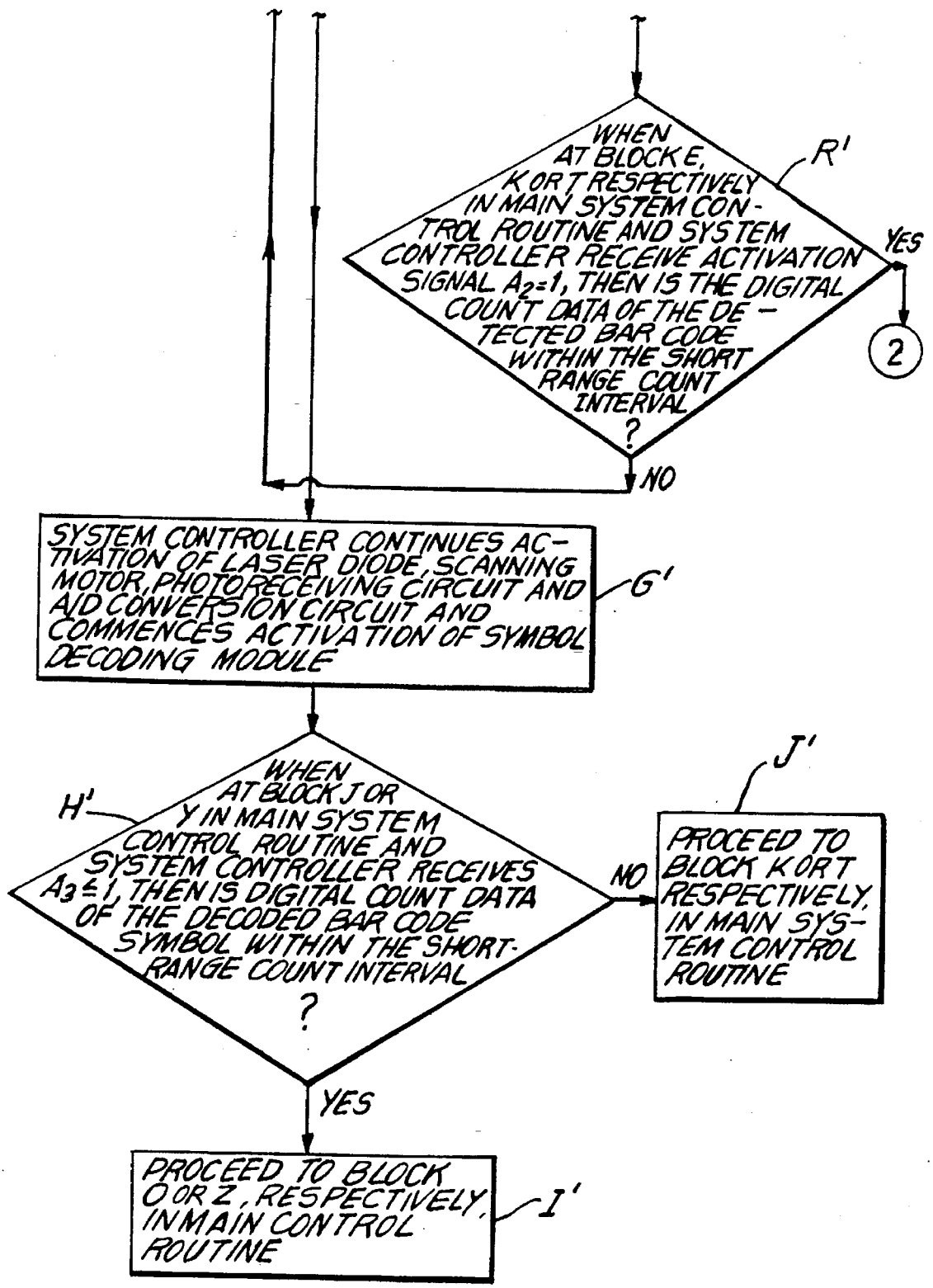
Figure 8C:
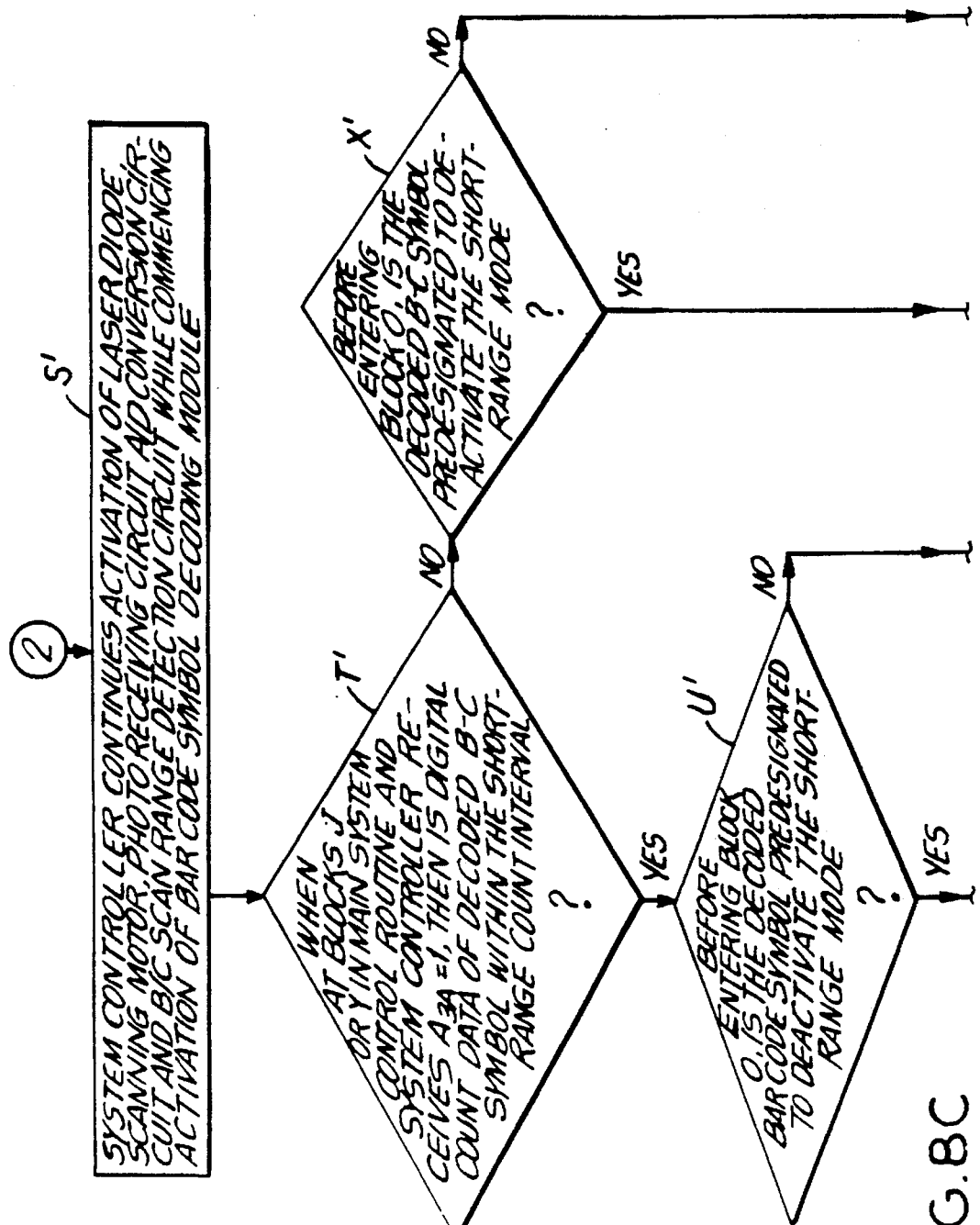
Figure 8D:
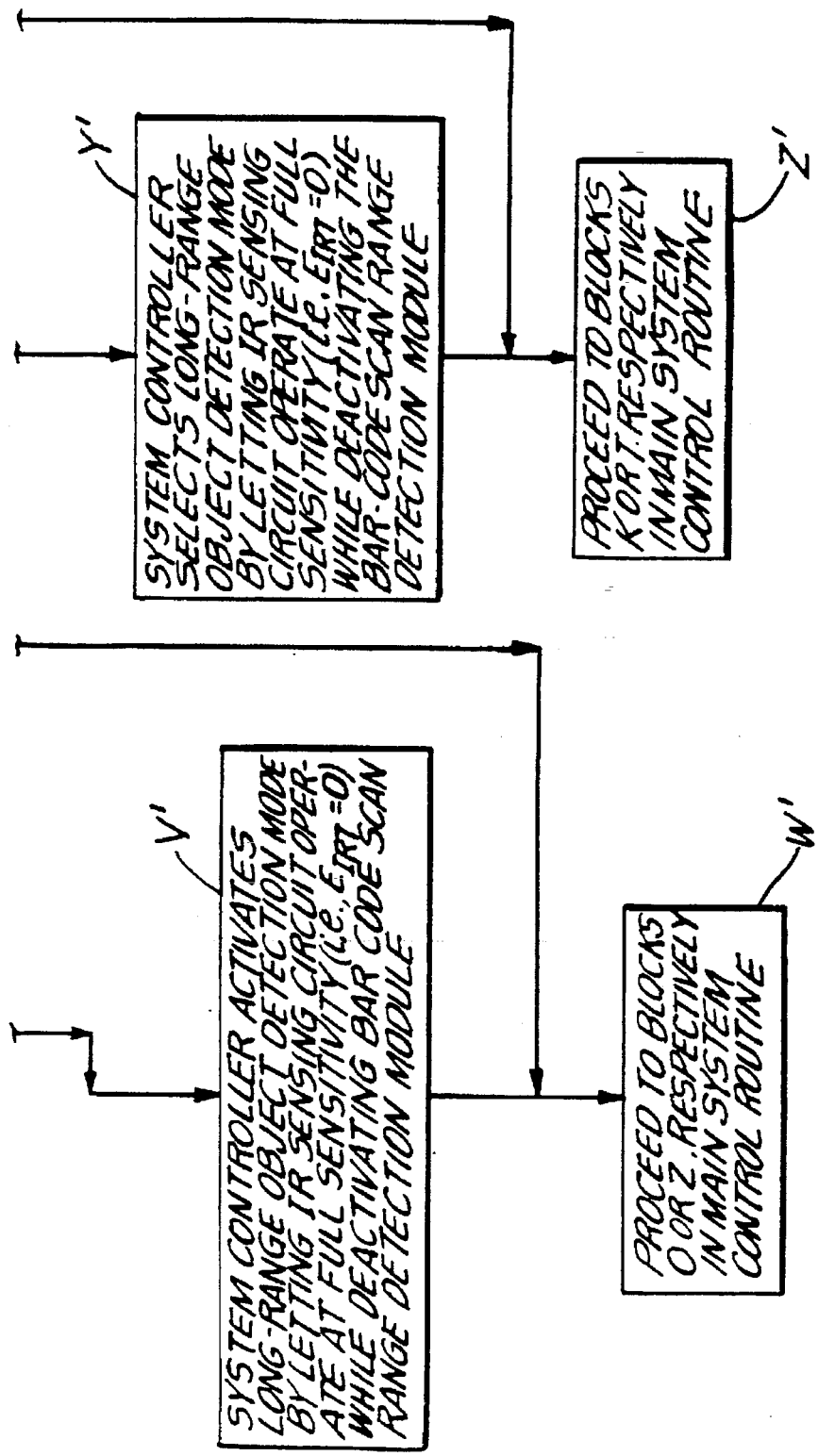

FIGS. 8 to 8D illustrates The Auxilliary System Control Routine with Range Selection which provides the automatic bar code reading device of the present invention with range selection capabilities for object detection, bar code presence detection, and bar code symbol reading. These range selection functions are provided when the system controller runs the Auxilliary System Control Routine of in cooperation with the Main System Control Routine described above. It is understood, however, that this Auxilliary System Control Routine may be adapted for use with other suitable system control programs.

Beginning at the START block and proceeding to Block A' of FIG. 8, the system controller initially selects the long-range object detection mode by letting the IR sensing circuit operate at full sensitivity (i.e. $E_{IRT}=0$). To determine whether the short-range mode of object detection, bar code symbol presence detection and bar code symbol reading has been selected, the system controller proceeds to Block B' and checks whether it has received control activation signal $A_4=1$. As described hereinbefore in connection with FIG. 4, activation signal $A_4=1$ can be generated in at least two possible ways. For example, the short-range mode may be manually selected by depressing switch 27 on the handle portion of the housing. Alternatively, the short-range mode may be selected by simply lifting the bar code reading device out from the scanner support stand, as illustrated in FIGS. 2, 11C, 14B, and 16B. In either case, prior to operating the bar code reading device, it is preferred that either the manual or automatic range mode selection mechanism be programmably set within the system controller by way of bar code menu programming, a technique well known in the art. For purposes of illustration only, the Auxilliary System Control Routine of FIGS. 8 to 8D will be described using the automatic range mode selection mechanism provided by magnetic sensing circuit 26.

If control activation $A_4=1$ signal is received at Block B', then the system controller selects short-range object detection by desensitizing the IR sensing circuit. This is achieved by providing mode selection enable signal $E_{IRT}=1$ as hereinbefore described. Then proceeding to Block D', the system controller enters the START block of Main System Control Routine of FIGS. 7 to 7D. Thereafter, the control flow proceeds as prescribed by the Main System Control Routine. Notably, whenever the control flow in the Main System Control Routine returns to the START block of FIG. 7A, the system controller exits Main System Control Routine and returns to the START block of FIG. 8.

As illustrated at Block E' of FIG. 8A, whenever the control flow is at Blocks D, I or R in the Main System Control Routine, the system controller activates bar code presence detection 20 module and bar code scan range detection module 21. Thereafter, while at any one of these control blocks, the bar code scan range detection module processes scan data signals $D_2$ so as to produce digital count and sign data as hereinbefore described. As indicated at Block F', an additional condition is placed on control Blocks E, K and T in the Main System Control Routine so that a transition from the bar code presence detection state to the bar code symbol reading state occurs only if (i) the object is detected in the short-range portion of the object detection field, and (ii) the bar code symbol is detected in the short-range portion of the scan field. In terms of data processing, when the system control flow is at any one of such blocks in the Main System Control Routine and the system controller receives control activation signal $A_2=1$, then the system controller also determines whether the digital count data of the detected bar code resides within the short-range count interval.

If the produced digital count data $D_{c1}$ indicates that the detected bar code symbol is located within the short-range portion of the scan field, then as indicated at Block G' of FIG. 8B, the system controller continues activation of the laser diode 50, scanning motor 53, photoreceiving circuit 18 and A/D conversion circuit 19, while commencing activation of symbol decoding circuit 22. As indicated at Block H', whenever the control flow is at either Block J or Block Y in the Main System Control Routine and the system controller receives third control activation signal $A_{3a}=1$, then the system controller determines whether the digital count data $D_{c1}$ from the decoded bar code symbol resides within the short-range count interval (i.e. $A_{3b}=1$ is produced from scan range detection module 21). If digital count data $D_{c2}$ resides within the short-range portion of the scan field, (i.e. $A_{3b}=1$) then as indicated at Block I', the system controller proceeds to Blocks O or Z, respectively, in the Main System Control Routine. If digital count data $D_{c2}$ is not within the short-range portion of the scan field (i.e. $A_{3b}=0$), then as indicated at Block J, the system controller proceeds to Blocks K or J, respectively, in the Main System Control Routine.

If, however, digital count data $D_{c1}$ produced at Block F' in FIG. 8A indicates that the detected bar code symbol is not located within the short-range portion of the scan field (i.e. $A_{2b}=0$), then as indicated at Block K' of FIG. 8A, the system controller proceeds to Blocks F, L or U, respectively, in the Main System Control Routine.

Turning attention to Block B' of FIG. 8, the system controller may not receive control activation signal $A_4=1$ from range selection circuits 26 or 27, as indicated at this block. Instead, short and long-range mode capabilities can be automatically selected by reading bar code symbols. This can be achieved by programming symbol decoding module 22 to recognize predesignated bar code symbols which automatically activate and deactivate long-range and short-range modes of object detection, bar code presence detection, and/or bar code symbol reading. This mechanism for automatic range selection is highly advantageous in many applications, such as, for example, reading bar code menus, CCD scanner emulation and the like.

As indicated at Block B' in FIG. 8, when control activation signal $A_4=1$, the system controller activates the long-range mode of object detection by letting IR sensing circuit 16A operate at full sensitivity (i.e. $E_{IRT}=O$), as indicated at Block L'. Then at Block M', the system controller enters the START block of Main System Control Routine of FIGS. 7A to 7D. As indicated at Block N', before entering Block O of the Main System Control Routine, the system controller determines whether the successfully read bar code symbol is a bar code symbol which has been predesignated to activate the short-range mode of object detection, bar code presence detection and/or bar code symbol reading. This condition is determined by the system controller checking whether control activation signal $A_5=1$ is received from the symbol decoding module as shown in FIG. 4. If control activation signal $A_5=0$ is received by the system controller, then as indicated at Block O' the system controller proceeds to Block O of the Main System Control Routine. If, however, control activation signal $A_5=1$ is received, then as indicated at Block P', the system controller activates the Short-range mode of object detection by desensitizing IR sensing circuit 16A (i.e. $E_{IRT}=O$). This operation ensures that control activation signal $A_1$ is produced only when an object is detected within the short-range portion of the object detection field. As indicated at Block Q' of FIG. 8A, whenever the system controller is at Block D, I or R in the Main System Control Routine. The System Controller activates bar code presence detection module 20 and bar code scan range detection module 21.

As indicated at block R' in FIG. 8B, an additional condition is placed on control blocks E, K and T in the Main System Control Routine. Specifically, a transition from the bar code presence detection state to the bar code symbol reading state occurs only if the detected bar code symbol resides in the short-range portion of the scan field. This condition is satisfied by the scan range detection module determining whether or not the digital count data of the detected bar code symbol falls within a prespecified short-range count interval. If this digital count data does not fall within the short-range count interval, then as indicated at Block R', the system controller proceeds to control Blocks F, L or U, respectfully, in the Main System Control Routine, as indicated at Block K'. If, however, the digital count data is within the prespecified short-range count interval, then control activation signal $A_{2B}=1$ is provided to the system controller as illustrated in FIG. 4. In this instance, both control activation signals $A_{2A}=1$ and $A_{2B}=1$ are provided to the system controller so as to effectuate a transition to the bar code symbol reading state. This event is represented at Block S' of FIG. 8C by the system controller continuing the activation of laser diode 50, scanning motor 53, photoreceiving circuit 18, A/D conversion circuit 19 and bar code scan range detection module 20, while deactivating bar code symbol detection module 21 and activating symbol decoding module 22.

As indicated at Block T' of FIG. 8C, when the control flow is at Blocks J or Y in the Main System control Routine and the system controller receives control activation signal $A_{3A}=1$, then the system controller determines whether the digital count data of the decoded bar code symbol is within the short-range count interval. If the bar code scan range detection module determines that decoded bar code symbol resides within the prespecified short-range portion of the scan field, then it provides third control activation signal $A_{3B}=1$ to the system controller, causing the bar code reading device to undergo a transition to the symbol character data transmission/storage state. In this case, as indicated at Block U', before entering Block O in the Main System Control Routine, the symbol decoding module determines whether the decoded bar code symbol is a short-range mode deactivation symbol. If the decoded bar code is such a symbol, then as indicated at Block V', the system controller activates the long-range mode by letting IR sensing circuit 16A operate at full sensitivity (i.e. $E_{IRT}=0$), while deactivating bar code scan range detection module 21. Thereafter, the system proceeds to Blocks O or Z, respectively, in the Main System Control Routine. If, however, the decoded bar code symbol is not a short-range mode deactivation symbol, then as indicated at Block U', the system proceeds directly to Blocks O or Z, respectively, in the Main System control Routine.

If, however, as indicated at Block T' the decoded bar code symbol does not reside within the short-range portion of the scan field, the system proceeds to Block X'. At this stage of the system control process, the symbol decoding module determines whether the decoded code symbol is a short-range mode deactivation symbol. If the decoded bar code symbol is such a symbol, then as indicated at Block Y', the system controller activates the long-range mode by letting IR sensing circuit 16A operate at full sensitivity, while deactivating bar code scan range detection module. Thereafter, the system proceeds to Blocks K or T, respectively, in the Main System Control Routine. If, however, the decoded symbol is not a short-range mode deactivation symbol, then as indicated at Block Y', the system controller activates the long-range mode by letting the IR sensing circuit 16A to operate at full sensitivity, while deactivating bar code scan range detection module 21. Thereafter, the system proceeds to Blocks K or T, respectively, in the Main System Control Routine. If, however, the decoded bar code Symbol is not a short-range mode deactivation symbol, then the system directly proceeds to Blocks K or T, respectively in the Main System Control Routine.

Having described the operation of the illustrative embodiment of the automatic hand-supportable bar code reading device of the present invention, it will be helpful to describe at this juncture the various conditions which cause state transitions to occur during its operation. In this regard, reference is made to FIG. 9 which provides a state transition diagram for the illustrative embodiment.

Figure 9:
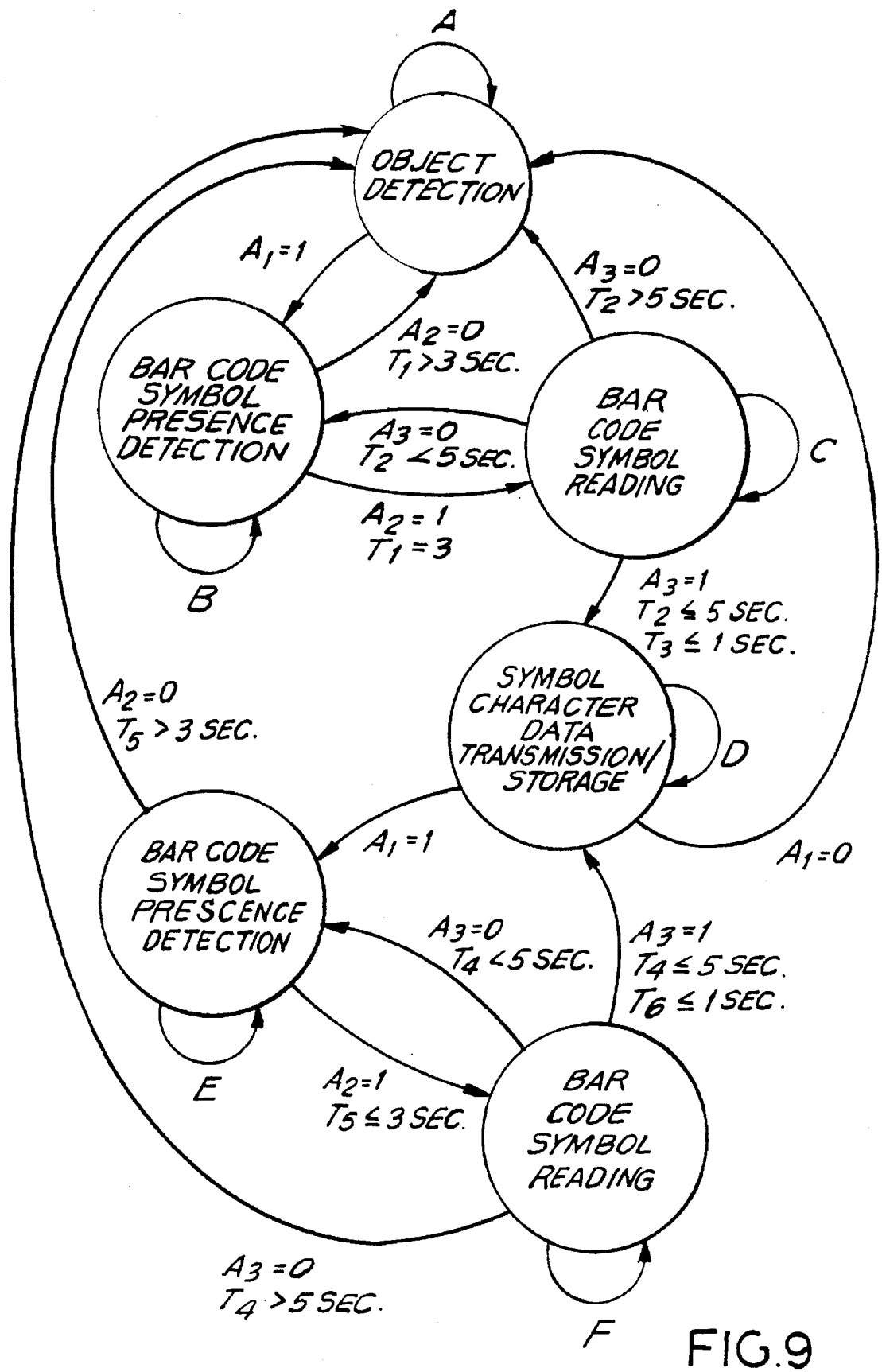
FIG. 9 is a state diagram illustrating the various states that the automatic hand-supportable bar code symbol reading device of the illustrative embodiment may undergo during the course of its programmed operation.

As illustrated in FIG. 9, the automatic hand-supportable bar code reading device of the, present invention has four basic states of operation namely: object detection, bar code symbol presence detection, bar code symbol reading, and symbol character data transmission/storage. The nature of each of these states has been described above in great detail. These four states are schematically illustrated as A, B, C and D, respectively, in the state transition diagram of FIG. 9. Notably, two "extensional states" have also been provided so that the automatic bar code reading device of the illustrative embodiment is capable of reading an infinite number of consecutively different bar code symbols on a particularly detected object (e.g. a product or apparently continous surface) without returning to the object detection state. These extensional states of operation are indicated as E and F and represent bar code presence detection and bar code symbol reading operations, respectively. As described above, these operations are employed when attempting to automatically read one or more consecutively different bar codes symbols, that is, after a first bar code symbol has been successfully read utilizing operational states A through C.

As shown in FIG. 9, transitions between the various states are indicated by directional arrows. Besides each set of directional arrows are transition conditions expressed in terms of control activation signals (e.g. $A_1$, $A_2$ and $A_3$), and where appropriate, state time intervals (e.g. $T_1$, $T_2$, $T_3$, $T_4$, $T_5$ and $T_6$). Conveniently, the state diagram of FIG. 9 expresses most simply the four basic and two extensional operations occurring during the control flow within the system control program of FIGS. 7A and 7B. Significantly, the control activation signals $A_1$, $A_2$ and $A_3$ in FIG. 9 indicate which events within the object detection and/or scan fields can operate to effect a state transition within the allotted time frame(s), where prescribed.

Figure 10:
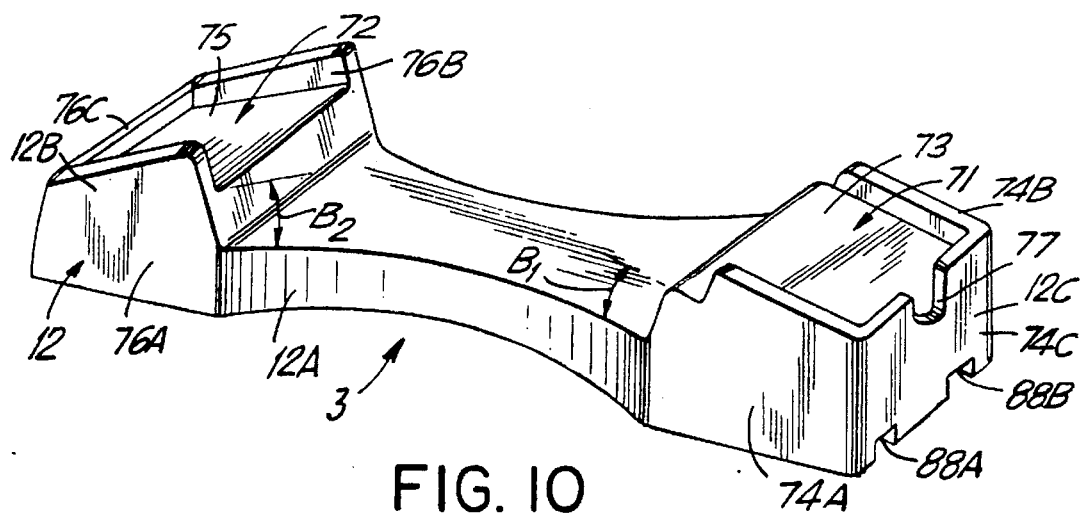
FIG. 10 is a perspective view of the support frame of the scanner support stand of the present invention.
Figure 10A:
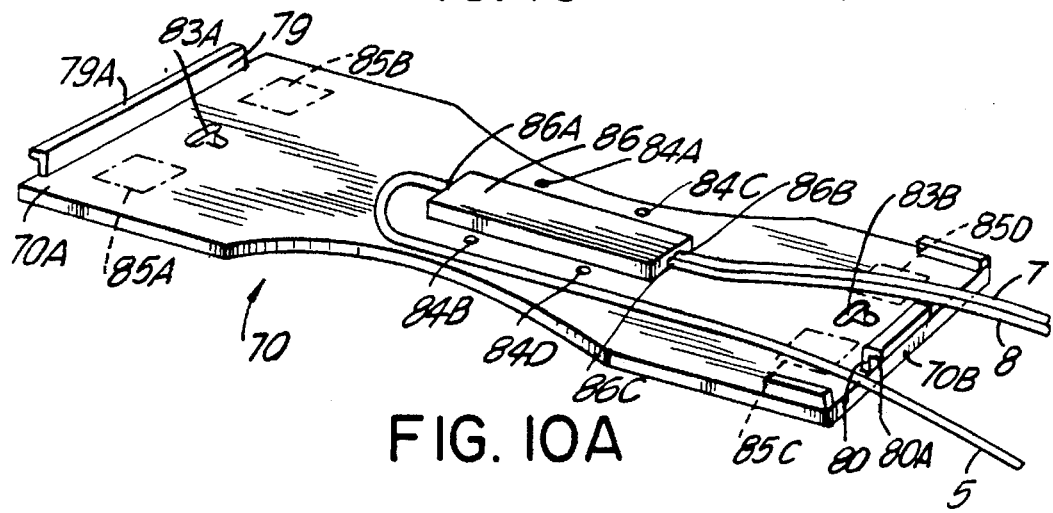
FIG. 10A is a perspective view of the base plate of the scanner support stand of the present invention, with the adapter module mounted thereon.
Figure 10B:
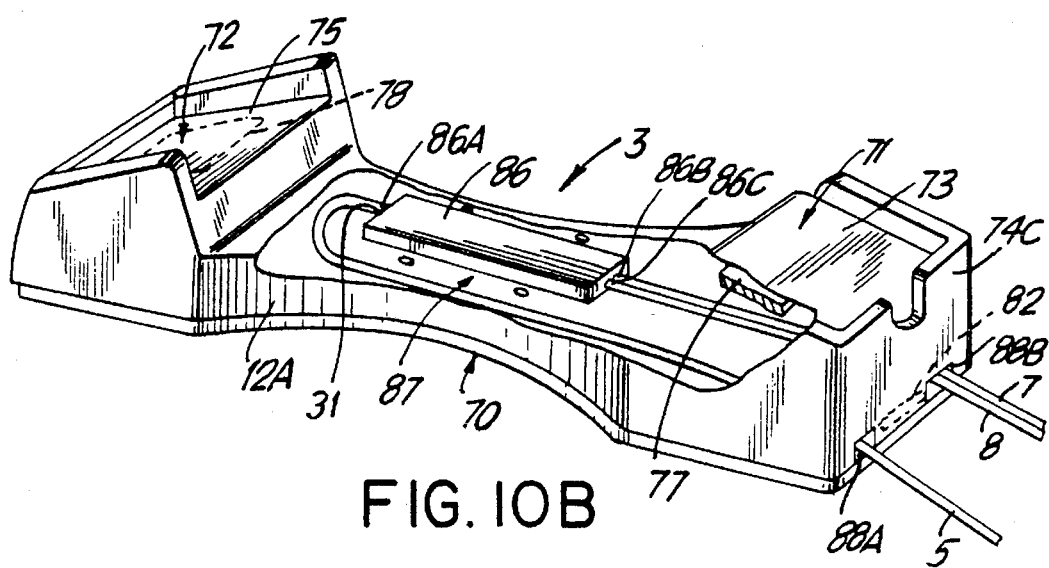
FIG. 10B is a perspective, partially broken away view of the assembled scanner support stand of the present invention, showing the scanner cable, power supply cable and communication cable operably associated therewith and routed through respective apertures formed in the scanner support

Referring now to FIGS. 10 through 10B, the scanner support stand of the present invention will be described.

Figure 13B:
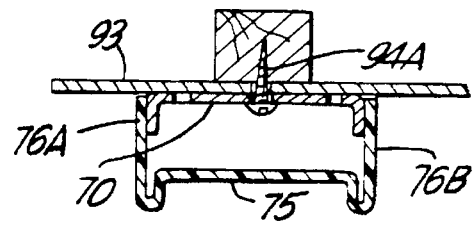
FIG. 13B is a cross-sectional view of the scanner support stand of the present invention, taken along line 13B—13B of FIG. 13.
Figure 13A:
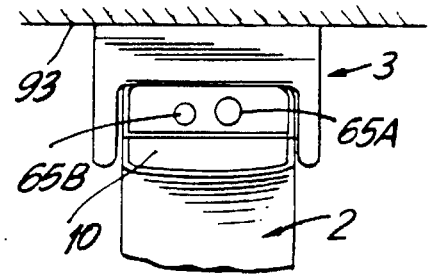
FIG. 13A is a plan view of the automatic bar code symbol reading system of the present invention taken along line 13A—13A of FIG. 13.
Figure 13C:
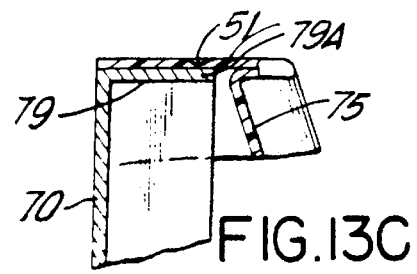
FIG. 13C is a cross-sectional view of the assembled scanner stand, taken along line 13C—13C of FIG. 15A.

As illustrated in FIGS. 10 to 10B, scanner stand 3 of the illustrative embodiment comprises support frame 12 releasably connected to a base support/mounting plate 70 by way of a snap fit fastening mechanism illustrated in FIG. 13C. In the illustrative embodiment support frame 12 is 30 formed as an injection molded shell, in which handle portion support structure 12C is realized by a first support recess 71; whereas head portion support structure 12B is realized by a second support recess 72. As shown in FIG. 10, first support recess 71 is disposed above base portion 12A and inclined at a first acute angle $B_1$ with respect thereto, while second support recess 72 is disposed above base portion 12B and inclined at a second acute angle $B_2$ with respect thereto.

As best shown in FIG. 10, first support recess 71 is formed by a first substantially planar support surface 73 surrounded by the projection of opposing side walls 74A and 74B and rear wall 74C, extending above planar support surface 73 in a perpendicular fashion. The function of support recess 71 is to receive and support the handle portion of hand-supportable bar code reading device. Similarly, second support recess 72 is formed by a second substantially planar support surface 45 surrounded by the projection of opposing side walls 76A and 76B and front wall surface 76C extending above planar support surface 75 in a perpendicular fashion. The function of support recess 72 is to receive and support the head portion of hand-supportable bar code reading device 2. In order that the handle portion of hand-supportable bar code reading device 2 can be received within support recess 71, rear wall 74C has a scanner cable aperture 77 which permits flexible scanner cable 5 to extend freely out beyond support recess 71. Also, front wall projection 76C is slightly lower than side wall projection 76A and 76B to ensure that pulsed IR energy is freely transmitted from and received by object detection circuit 16A contained within head portion 9A. At the same time, this structural feature of the scanner support stand ensures that visible laser light is projected, scanned and collected through light transmissive window 10 without obstruction, i.e. when the automatic bar code reading device is operated in its automatic hands-free mode, shown in FIGS. 15A and 15B, and 17A and 17B.

In order to ensure that the hand-supportable bar code reading device of the present invention will be securely, yet releasably supported within support recesses 71 and 72 and not easily knocked out of the scanner support stand during the hands-free made of operation, first and second magnetic elements 77 and 78 are permanently mounted to the underside of planar support surfaces 73 and 75, respectively, as illustrated in FIG. 10B. With this arrangement, magnetic flux of constant intensity continuously emanates from support recesses 71 and 72. As a result, when the handle and head portions of the bar code reading device are placed within support recesses 71 and 72, ferrous element 61 in handle portion 9A is magnetically attracted to magnetic element 77, while ferrous element 62 on head portion 9B is magnetically attracted to magnetic element 78. The magnetic force of attraction between these elements is selected so that a desired degree of force is required to lift the automatic bar code reading device out of scanner support stand, while preventing accidental displacement of the device from the scanner support stand during use in the hands-free mode of operation.

As illustrated in FIG. 10A, base support/mounting plate 70 is formed as a thin planar structure having perimetrical dimensions substantially equal to the perimetrical dimensions of the base portion of support frame 12. At the front and rear end portions 70A and 70B of base plate 70, a pair of projections 79 and 80 extend perpendicularly, as shown. Projections 79 and 80 have horizontal flanges 79A and 80A, respectively, which are adapted to snap fit into horizontal grooves 81 and 82, formed on the interior surfaces of front and rear walls 76C and 74C, as shown in FIGS. 10A, 10B and 13C.

Figure 11A:
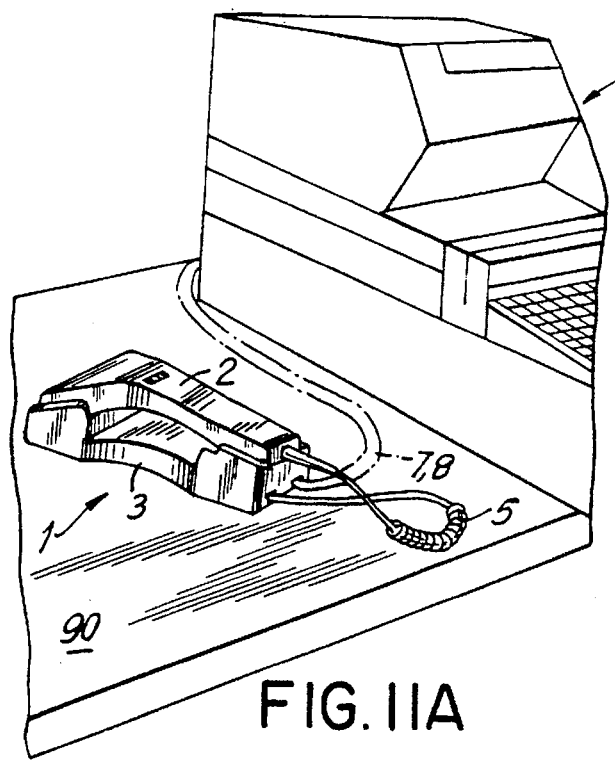
FIGS. 11A, 11C, and 11D are perspective views of a point-of-sale system, showing the scanner support stand of the present invention supported on a horizontal countertop surface and operably connected to an electronic cash register, with the automatic hand-supportable bar code symbol reading device being used in its hand-held short-range mode of operation.
Figure 11B:
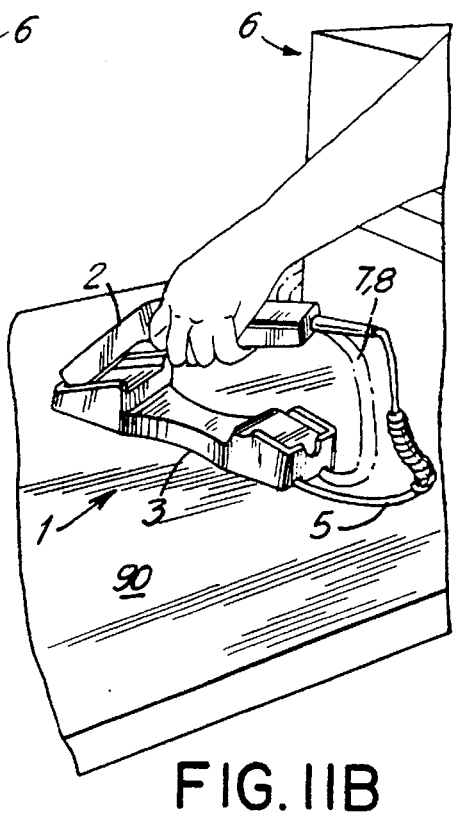
Figure 11C:
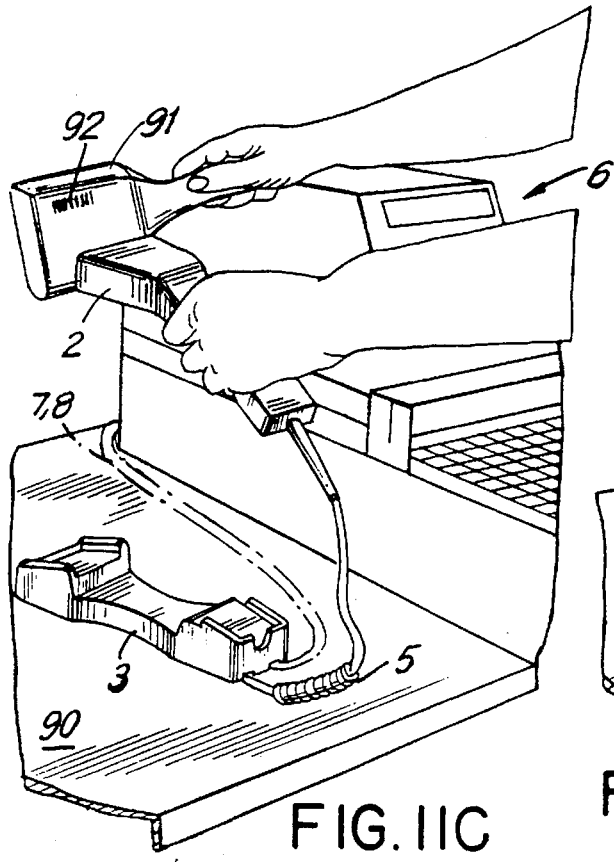
Figure 11D:
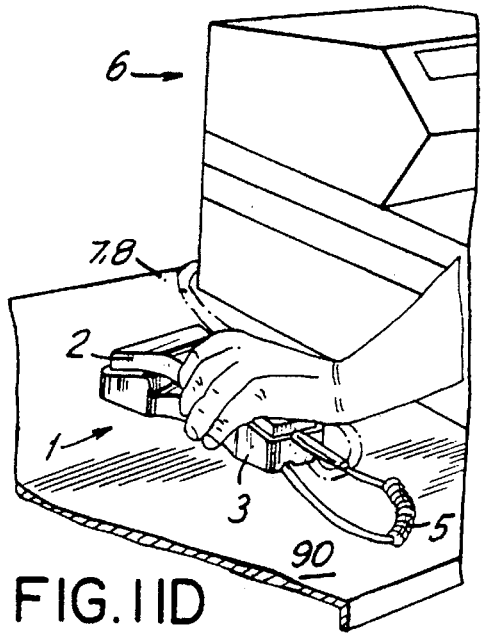
Figure 12A:
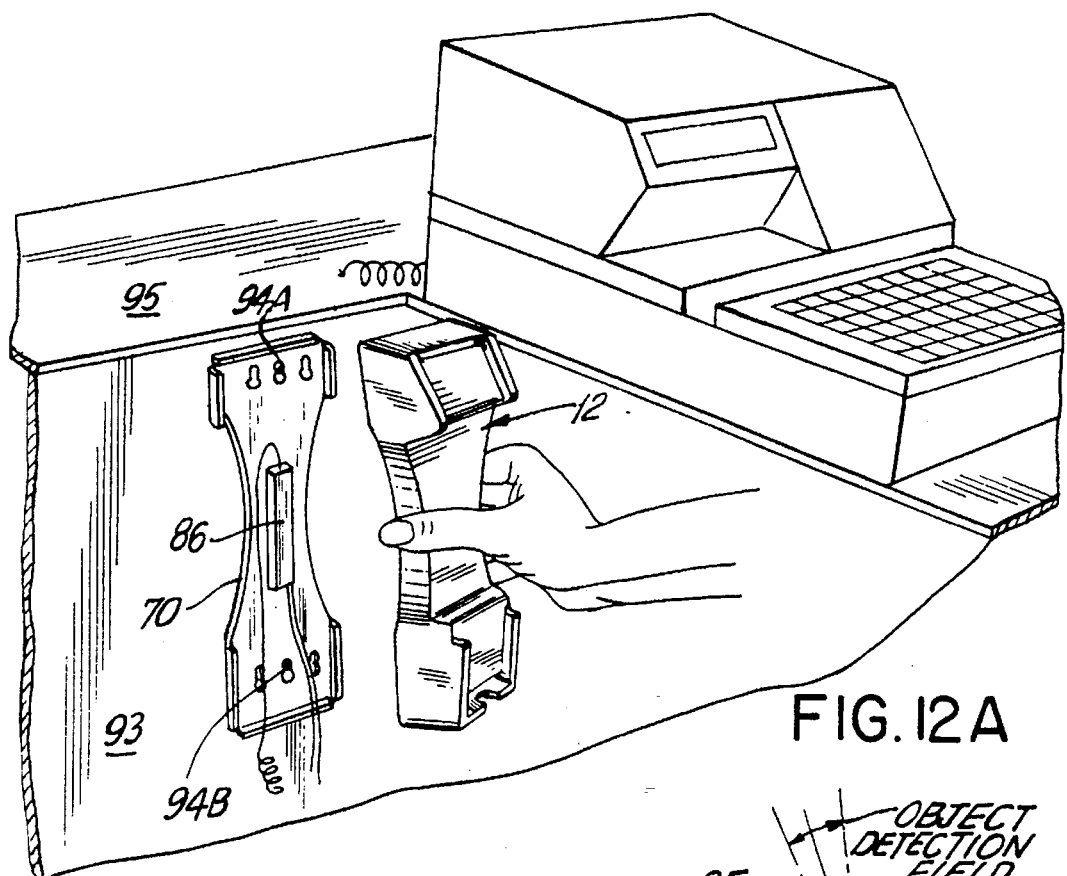
FIGS. 12A and 12B are perspective views illustrating the steps carried out during the installation of the scanner support stand of the present invention onto a vertical counter wall surface.
Figure 12B:
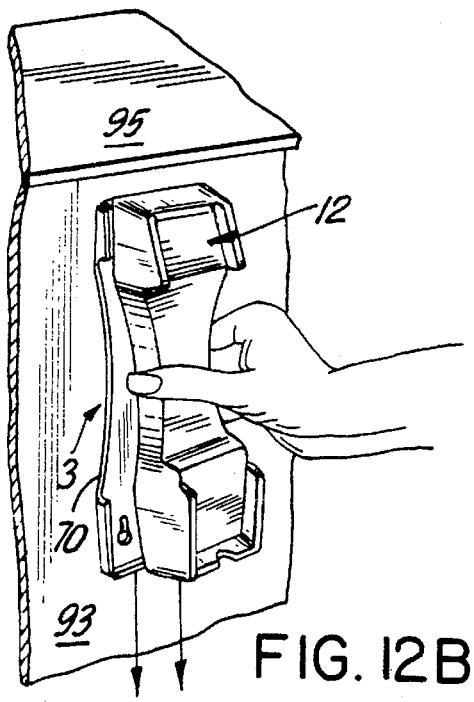

To facilitate mounting of base plate 70 on a planar mounting surface, as illustrated in FIGS. 12A and 12B, a pair of spaced apart mounting holes 83A and 83B are provided. To facilitate attachment of base plate 70 to pivotal joint assembly 97 of pedestal base 98, as illustrated in FIGS. 18A through 18C, a set of four centrally disposed mounting holes 84A, 84B, 84C and 84D are provided. To facilitate support of base plate 70 upon a horizontal support surface, as illustrated in FIGS. 11A through 11D, a set of four rubber feet 85A, 85B, 85C and 85D may be adhesively applied to the underside corners of the base plate 70.

In order to eliminate the confusion produced by various cables used to connect automatic bar code scanning device 2 to its external power supply (not shown) and associated host computer system 6, an adapter module 86 is concealed within the interior volume 87 contained between the interior surface of base portion 12A of the support frame and the upper surface of base plate 70. In the illustrated embodiment, adapter module 86 is adhesively affixed to the central portion of the upper surface of base plate 70, as illustrated in FIG. 10A. Scanner connector 31 of flexible scanner cable 5 is plugged into scanner jack 86A of the adapter module, and the communication cable connector of flexible communication cable 7 is plugged into communication jack 86B. Similarly, the power supply connector from the DC power supply cable 8 is plugged into power supply jack 86C, as shown. With these interconnections established, support frame 12 is snapped onto base plate 70, as hereinbefore described, flexible scanner cable 5 is routed through aperture 88A, and flexible communication and power supply cables 7 and 8 are routed through aperture 88B formed in the lower portion of rear wall 74C of the support frame, as shown in FIG. 10B.

In the illustrative embodiment, automatic bar code reading device 2 requires one regulated DC supply voltage to power the visible laser diode and other electronic and opto-electronic components mounted on circuit boards 63 and 69. However, in many applications, a 12 V DC supply voltage is available at the point-of-sale station. Thus, in order to convert the 12 V Dc supply voltage to a 5 V DC supply voltage, a DC-to-DC voltage converter is incorporated into adapter module 86. In this way, in addition to providing interconnections between the communication lines of the flexible scanner and communication cables, adapter module 86 also provides a means for converting the voltage level of the flexible power supply cable to one or more required voltages to be utilized in the bar code reading device.

The automatic bar code reading device of the present invention has been described in great detail. Thus, it is appropriate at this juncture to illustrate the automatic hands-on and hands-free modes of operation of the system while utilized in different mounting installations.

In FIGS. 11A through 11D, a point-of-sale station is shown comprising an electronic cash register 6 operably connected to the automatic bar code reading system of the present invention by way of flexible communication cable 7. Low voltage DC power is provided to the system by way flexible power supply cable 8. In this particular mounting installation, scanner support stand 3 includes rubber feet 85A through 85D and is supported on a horizontal countertop surface 90. If necessary or desired in such mounting installations, base plate 70 may be weighted by affixing one or more dense mass elements to the upper surface of the base plate.

With automatic bar code reading device 2 supported within scanner support stand 3 as shown in FIG. 11A, the system is automatically induced into its automatic long-range hands-free mode of operation. However, owing to the positioning of both object detection and scan fields in this mounting installation, only bar code symbols located on small, very low profile objects can be easily read. In order to induce the system into its short-range hands-on mode of operation, the user simply encircles the handle portion of the hand-supportable device with his or her fingers, and then lifts the device out of the scanner support stand, as shown in FIG. 11B. With the automatic bar code reading device held in the user's hand, and a bar coded object 91 in the other hand, the object is moved into the short-range portion of the object detection field as shown in FIG. 11C, where the object is automatically detected and bar code symbol 92 automatically scanned by the visible laser beam repeatedly scanned across the scan field. After the bar code symbol has been successfully read and an audible and/or visible indication thereof produced by successful read indicator 120, the bar code reading device is placed back within the scanner support stand, as shown in FIG. 11A, where it is once again induced into its long-range hands-free mode of operation.

In FIGS. 12A and 12B, the scanner support stand of the present invention is shown being installed on a vertical counter wall surface of a point-of-sale station having an electronic cash register 6. As shown in FIGS. 12A and 13B, to install the scanner support stand, a pair of spaced apart mounting screws 94A and 94B are partially screwed into vertical counter wall surface 93 so that base plate 70 will be vertically arranged slightly below horizontal countertop surface 95. Then, mounting holes 83A and 83B and screws 94A and 94B are passed through base plate 70, and then the base plate is slid down slightly and screws 94A and 94B completely threaded into the vertical counter wall surface. After attaching adaptor module 86 and flexible scanner, communication and power supply cables 5, 7, and 8 into their respective jacks in the adaptor module, support frame 12 is snap fitted over the mounted base plate, as shown in FIG. 12B, to provide an installed automatic bar code reading system, as shown in FIG. 13.

Figure 14:
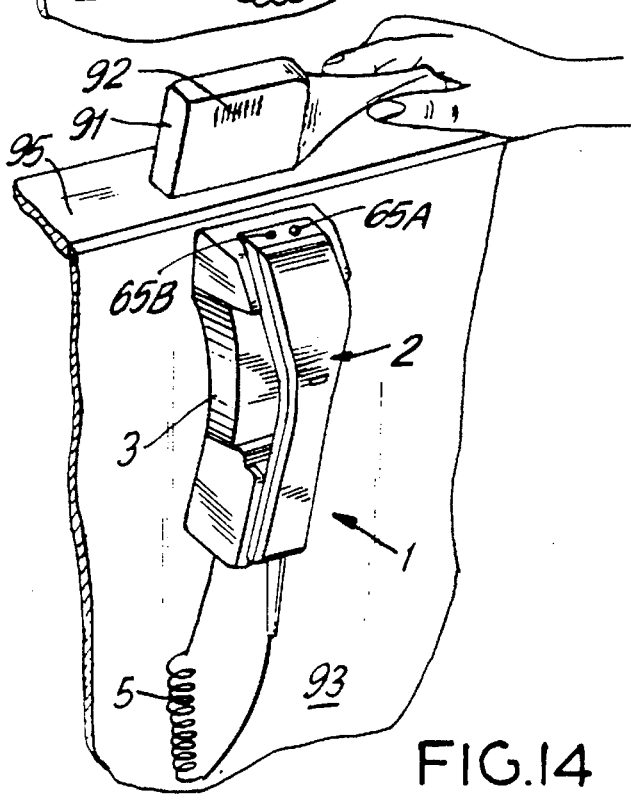
FIG. 14 is perspective views showing the scanner support stand mounted on a vertical counter wall surface, and the automatic hand-supportable bar code symbol reading device being used in its automatic hands-free long-range mode of operation.

With automatic bar code reading device 2 positioned within scanner stand 3 as shown in FIG. 14, the system is automatically induced into its long-range hands-free mode of operation. In this configuration, bar code symbol 92 on object 91 can be easily read by the user grasping the object and bringing it into the short-range portion of the object detection field, as illustrated in FIG. 14. Thereupon, the object is automatically detected and bar code symbol 92 scanned by the visible laser beam repeatedly scanned across the scan field.

Figure 15B:
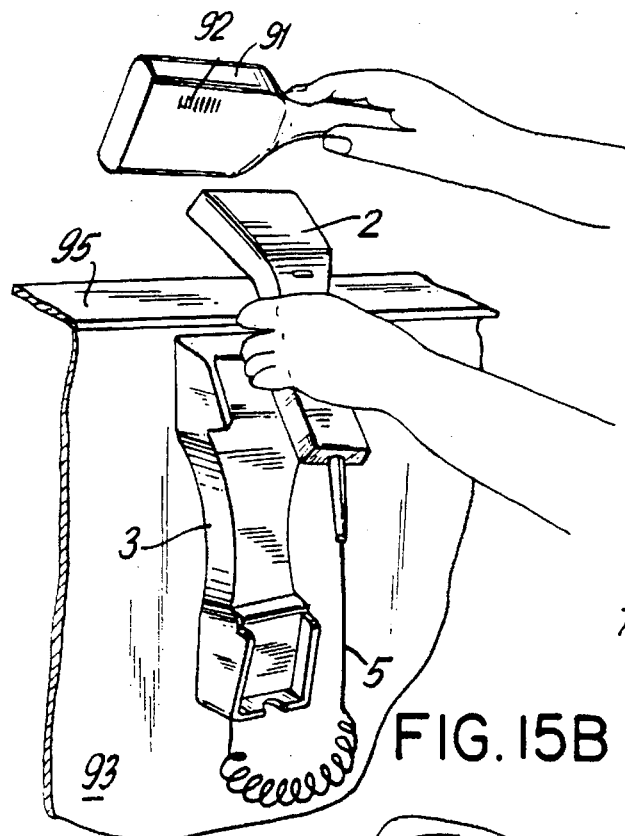

In order to read bar code symbols in the short-range hands-on mode of operation, the user grasps the handle portion of the bar code reading device as illustrated in FIG. 15A, and lifts it out of the scanner support stand. Then the user brings object 91 into the short-range portion of the object detection field as illustrated in FIG. 15B, so as to automatically detect the object and scan bar code symbol 92 with the visible laser beam repeatedly moving across the scan field. After the bar code symbol has been successfully read and an audible and/or visible indication thereof produced, the bar code reading device is placed back into the scanner support stand, automatically inducing the system into its long-range hands-free mode of operation.

Figure 17A:
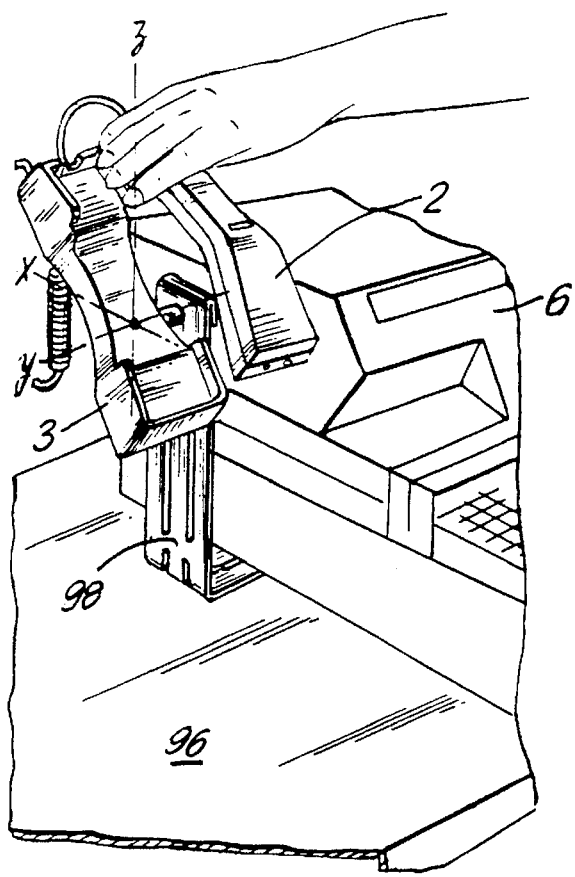
FIGS. 17A and 17B are perspective views of a point-of-sale station according to the present invention, showing the scanner support stand pivotally supported above a horizontal counter surface by way of the pedestal base illustrated in FIG. 16, and the automatic hand-supportable bar code symbol reading device being used in its automatic hand-held short-range mode of operation.
Figure 16:
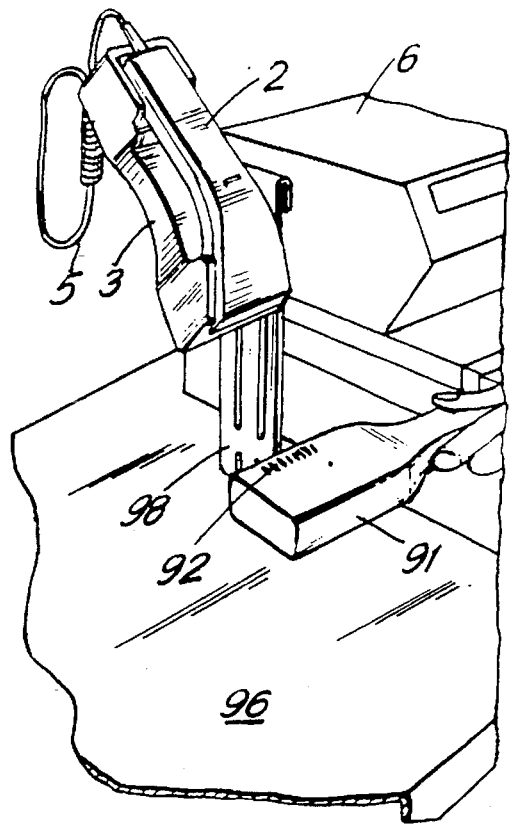
FIG. 16 is a perspective view of a point-of-sale station according to the present invention, showing the scanner support stand pivotally supported above a horizontal counter surface by way of a pedestal base mounted under an electronic cash register, and the automatic hand-supportable bar code symbol reading device received in the scanner support stand and being used in its automatic hands-free long-range mode of operation.
Figure 17B:
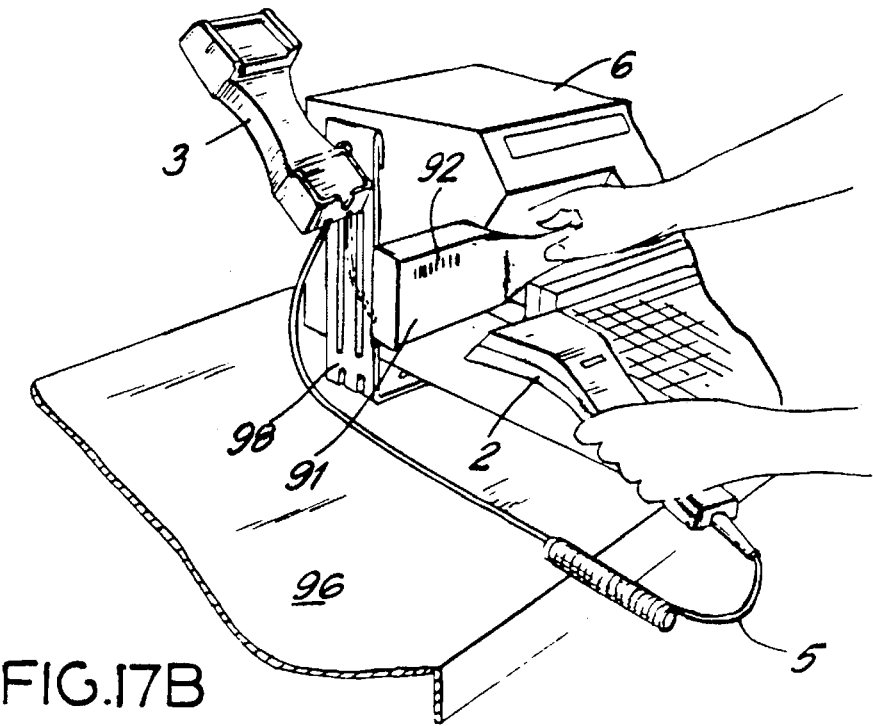

In FIGS. 16 through 17B, a point-of-sale station is shown comprising the automatic bar code reading system of the present invention operably connected to electronic cash register 6 by way of flexible communication and power supply cables 7 and 8. In this particular mounting installation, scanner support stand 3 is pivotally supported above a horizontal counter surface 96 by way of a pivotal joint assembly 97 connected to pedestal base 98 mounted under the electronic cash register.

As more clearly illustrated in FIG. 18, pivotal joint assembly 97 comprises a ball structure 99 joined to a mounting plate 100 by an extension 101. The pivotal joint assembly 97 also comprises a semispherical recess 102 formed in the end of a cylindrical support post 103. As shown in FIG. 18A, a ball clamping element 104, having a semispherical recess 105 and a bore 106, is connected to the distal end portion of support post 103 by an adjustment screw 107 passing through bore 106 and threaded into a hole 108 in the distal end portion of the support post. By rotating knob 109 attached to adjustment screw 107, aligned semispherical recesses 102 and 105 can be sufficiently separated apart to receive and retain ball structure 99. With this structural arrangement, ball structure 99 can be securely clasped within semispherical recesses 102 and 105 at any desired orientation by simply tightening adjustment screw 107 with several turns of knob 109. As illustrated in FIG. 18A mounting plate 100 is fixedly connected to base plate 70 by bolts 110A through 110D threaded through holes 111A through 111D and 84A through 84D, respectively.

As illustrated in FIG. 18, the proximal end of support post 103 is fixedly connected to the upper portion of pedestal base member 98A, by screw 112. In order to maintain the scanner support stand stationary during bar code reading operations, pedestal base member 98B is mounted under electronic cash register 6. When installed in the manner illustrated, scanner support stand 3 can be adjustably positioned and locked into virtually any orientation in three-dimensional space, owing to the three principle degrees of freedom provided by the pivotal joint assembly. In FIGS. 16A, 18, 18B and 18C, these degrees of freedom are illustrated with respect to the cartesian coordinate system shown embedded within the pivotal joint assembly of the pedestal-mounted scanner support stand.

With automatic bar code reading device positioned within scanner stand 3 as shown in FIG. 16, the system is automatically induced into its long-range hands-free mode of operation. By simply moving object 91 into the object detection field, the bar code symbol 92 is repeatedly scanned by the visible laser beam scanned across the scan field. To induce the automatic bar code reading system into its short-range hands-on mode of operation, the user simply grasps the automatic bar code reading device and lifts it out of the scanner support stand, as illustrated in FIG. 17A. Then, by placing object 91 into the short-range portion of the object detection field, the object is automatically detected and bar code symbol 92 scanned by the visible laser beam repeatedly scanned across the scan field. After the bar code symbol has been successfully read and an audible and/or visible indication thereof produced, the automatic bar code reading device can be placed back into the scanner support stand, automatically inducing the system into its long-range hands-free mode of operation.

Having described the preferred embodiment of the present invention, several modifications come to mind.

For example, in alternative embodiments of the present invention, the automatic hand-supportable device may not incorporate within its housing, electronic circuitry for carrying out control, decoding other data processing functions; instead such electronic circuitry may be contained within a remote unit operably associated with the hand-supportable device by way of the flexible scanner cable. In this embodiment, the hand-supportable device will function as an automatic hand-supportable laser scanner. Alternatively, the housing may be adapted for hand-mounting.

The automatic bar code reading device and scanner support stand of the present invention provides a fully automatic bar code reading system characterized by a automatic long-range hands-free and short-range hand-on mode of operation, high-speed symbol recognition, and versatility.

The automatic hand-supportable bar code reading device of the present invention has been provided with a wide variety of complex decision-making operations, endowing the system with a level of intelligence hitherto unattained in the bar code symbol reading art. Within the spirit of the present invention, additional decision-making operations may be provided to further enhance the capabilities of the system.

While the particular illustrative embodiments shown and described above will be useful in many applications in code symbol reading, further modifications to the present invention herein disclosed will occur to persons skilled in the art. All such modifications are deemed to be within the scope and spirit of the present invention defined by the appended claims.

What is claimed is:

1. An automatic code symbol reading system comprising:
   (A) laser projection scanning device supportable above a work space, and including
      (1) a compact housing having a light transmissive window through which visible light can exit and enter said hand-supportable housing,
      (2) an activatable laser beam source in said compact housing for producing, when activated, a laser beam projected through said light transmissive window and into a scan field defined external to said compact housing,
      (3) an activatable scanning mechanism in said compact housing for scanning, when activated, said laser beam across said scan field according to a laser scanning pattern characterized as having at least one scanning plane of essentially planar extent,
      (4) light detection means in said compact housing for detecting the intensity of laser light reflected off a code symbol as said visible laser beam is scanned across said scan field and said code symbol therein, and for automatically producing scan data indicative of the detected intensity of said reflected laser light, and
      (5) object detection means in said compact housing for detecting the presence of an object within an object detection field definable external to said compact housing, and producing in response thereto an activation signal, said object detection field being characterized as having a volumetric extent and said laser projection scanning device having an operative scanning range measured from a distance in front of said light transmissive window out towards a region within scan field, and said object detection field spatially encompassing at least a portion of said scan field within said operative scanning range;

(B) processing means for processing produced scan data so as to decode said code symbol on said detected object, and upon decoding said code symbol on said detected object, automatically producing symbol character data representative of said decoded code symbol; and (C) control means for controlling the operation of said automatic code symbol reading system, said control means including (1) means for automatically activating said activatable laser beam source and said activatable scanning mechanism for up to a predetermined time period in response to the generation of said activation signal, and (2) means for automatically deactivating said activatable laser beam source and said activatable scanning mechanism in response to said processing means failing to decode said code symbol on said detected object within said predetermined time period.

2. The automatic code symbol reading system of claim 1, wherein said object detection means has at least a short-range mode of object detection and a long-range mode of object detection, wherein said object detection means is in said short range mode of object detection, said object detection means is capable of detecting the presence of the object located within a short range measured from a distance in front of said light transmissive window out towards a first region within said object detection field, and wherein, when said object detection means is in said long-range mode of object detection, said object detection means is capable of detecting the presence of the object located within a long range measured from a distance in front of said light transmissive window out towards a second region within said object detection field.

3. The automatic code symbol reading system of claim 2, wherein said code symbol scanning device further comprises means for operating said object detection means in said short range mode of object detection in response to the absence of a long range mode activation signal, and for operating said object detection means in said long range mode of object detection in response to the presence of said long range mode activation signal.

4. The automatic code symbol reading system of claims 2, wherein hand-supportable housing has a longitudinal dimension which extends in a longitudinal direction, and wherein said scan field and said object detection field extend from about said light transmission window in a direction substantially parallel to the longitudinal extent of said hand-supportable housing.

5. The automatic code symbol reading system of claim 2, wherein said hand-supportable housing comprises a head portion and a handle portion.

6. The automatic code symbol reading system of claim 1, wherein said object detection means comprises means for transmitting an infra-red light signal into said object detection field, and means for receiving at least a portion of said transmitted infra-red light signal reflected off the object in said object detection field and producing said activation signal in response thereto.

7. The automatic code symbol reading device of claim 1, wherein said processing means and said control means are disposed in said hand-supportable housing.

8. The automatic code symbol reading system of claim 1, wherein said code symbol is a bar code symbol.

9. The automatic code symbol reading system of claim 1, wherein said object detection means comprises a synchronous receiver/transmitter.

10. The automatic code symbol reading system of claim 1, wherein said object detection field spatially encompasses a central portion of said scan field within said operative scanning range.

11. An automatic code symbol reading system comprising:

(A) a laser projection scanning device supportable within a workspace, and including (1) a compact housing having a light transmissive window through which light can exit and enter said hand-supportable housing, (2) an activatable scan data producing means, disposed in said compact housing, for producing scan data from a code symbol, comprising graphical indicia of different light relectivity said activatable scan data producing means including (2) (a) laser beam source for producing a laser beam projected through said light transmissive window and into a scan field defined external to said compact housing, (2) (b) a scanning mechanism for scanning said laser beam across said scan field according to a laser scanning pattern characterized as having at least one scanning plane of essentially planar extent, and (2) (c) light detection means for detecting the intensity of laser light reflected off a code symbol as said laser beam is scanned across said scan field and said code symbol therein, and for automatically producing scan data indicative of the detected intensity of said reflected laser light, and (3) object detection means in said compact housing for detecting the presence of an object within an object, detection field definable external to said compact housing, and producing in response thereto an activation signal, said object detection field being characterized as having volumetric extent and said laser projection scanning device having an operative scanning range measured from a distance in front of said light transmissive window out towards a region within scan field, and said object detection field spatially encompassing at least a portion of said scan field within said operative scanning range;

(B) processing means for processing produced scan data so as to decode said code symbol on said detected object, and upon decoding said code symbol on said detected object, automatically producing symbol character data representative of said decoded code symbol; and (C) control means for controlling the operation of said automatic code symbol reading system, said control means including means for automatically activating said activatable scan data producing means for up to a predetermined time period in response to the generation of said activation signal, and means for automatically deactivating said activatable scan data producing means in response to said processing means failing to decode said code symbol on said detected object within said predetermined time period.

12. The automatic code symbol reading system of claim 11, wherein said object detection means has at least a short-range mode of object detection and a long-range mode of object detection, wherein said object detection means is in said short range mode of object detection, said object detection means is capable of detecting the presence of the object located within a short range measured from a distance in front of said light transmissive window out towards a first region within said object detection field, and wherein, when said object detection means is in said long-range mode of object detection, said object detection means is capable of detecting the presence of the object located within a long range measured from a distance in front of said light transmissive window out towards a second region within said object detection field.

13. The code symbol reading system of claim 12, wherein said code symbol scanning device further comprises means for operating said object detection means in said short range mode of object detection in response to the absence of a long range mode activation signal, and for operating said object detection means in said long range mode of object detection in response to the presence of said long range mode activation signal.

14. The code symbol reading system of claim 11, wherein said object detection means comprises means for transmitting an infra-red light signal into said object detection field, and means for receiving at least a portion of said transmitted infra-red light signal reflected off the object in said object detection field and producing said activation signal in response thereto.

15. The automatic code symbol reading system of claim 11, wherein said code symbol is a bar code symbol.

16. The automatic code symbol reading system of claim 11, wherein said object detection means comprises a synchronous receiver/transmitter.

17. The automatic code symbol reading system of claim 11, wherein said compact housing comprises a hand-supportable housing having a longitudinal dimension which extends in a longitudinal direction, and wherein said scan field and said object detection field extend from about said light transmission window in a direction substantially parallel to the longitudinal extent of said hand-supportable housing.

18. The automatic code symbol reading system of claim 11, wherein said object detection field spatially encompasses a central portion of said scan field within said operative scanning range.

19. The automatic code symbol reading system of claim 17, wherein said hand-supportable housing comprises a head portion and a handle portion.

20. The code symbol reading system of claim 11, wherein said object detection means comprises means for transmitting an infra-red light signal into said object detection field, and means for receiving at least a portion of said transmitted infra-red light signal reflected off the object in said object detection field and producing said activation signal in response thereto.

21. An automatic code symbol reading system comprising:

(A) a laser projection scanning device supportable within a workspace, and including (1) a compact housing having a light transmissive window through which light can exit and enter said hand-supportable housing, (2) scan data producing means disposed in said compact housing, for producing scan data from a code symbol, comprising graphical indicia of different light relectivity, said scan data producing means including (2) (a) laser beam source for producing a laser beam projected through said light transmissive window and into a scan field defined external to said compact housing, (2) (b) a scanning mechanism for scanning said laser beam across said scan field according to a laser scanning pattern characterized as having at least one scanning plane of essentially planar extent, and (2) (c) light detection means for detecting the intensity of lapser light reflected off a code symbol as said laser beam is scanned across said scan field and said code symbol therein, and for automatically producing scan data indicative of the detected intensity of said reflected laser light, and (3) object detection means in said compact housing for detecting the presence of an object within an object detection field definable external to said compact housing, and producing in response thereto an activation signal, said object detection field being characterized as having a volumetric extent and said laser projection scanning device having an operative scanning range measured from a distance in front of said light transmissive window out towards a region within scan field, and said object detection field spatially encompassing at least a portion of said scan field within said operative scanning range;

(B) processing means for processing produced scan data so as to decode said code symbol on said detected object, and upon decoding said code symbol on said detected object, automatically producing symbol character data representative of said decoded code symbol; and (C) control means for controlling the operation of said automatic code symbol reading system.

22. The automatic code symbol reading system of claim 21, wherein said control means comprises means for automatically activating said scan data producing means for up to a predetermined time period in response to the generation of said activation signal, and means for automatically deactivating said scan data producing means in response to said processing means failing to decode said code symbol on said detected object within said predetermined time period.

23. The automatic code symbol reading system of claim 21, wherein said object detection means has at least a short-range mode of object detection and a long-range mode of object detection, wherein said object detection means is in said short range made of object detection, said object detection means is capable of detecting the presence of the object located within a short range measured from a distance in front of said light transmissive window out towards a first region within said object detection field, and wherein, when said object detection means is in said long-range mode of object detection, said object detection means is capable of detecting the presence of the object located within a long range measured from a distance in front of said light transmissive window out towards a second region within said object detection field.

24. The code symbol reading system of claim 23, wherein said code symbol scanning device further comprises means for operating said object detection means in said short range mode of object detection in response to the absence of a long range mode activation signal, and for operating said object detection means in said long range mode of object detection in response to the presence of said long range mode activation signal.

25. The automatic code symbol reading system of claim 21, wherein said code symbol is a bar code symbol.

26. The automatic code symbol reading system of claim 21, wherein said object detection means comprises a synchronous receiver/transmitters.

27. The automatic code symbol reading system of claim 21, wherein said compact housing comprises a hand-supportable housing having a longitudinal dimension which extends in a longitudinal direction, and wherein said scan field and said object detection field extend from a distance in front of said light transmission window in a direction substantially parallel to the longitudinal extent of said hand-supportable housing.

28. The automatic code symbol reading system of claim 27, wherein said hand-supportable housing comprises a head portion and, a handle portion.

29. The automatic code symbol reading system of claim 21, wherein said object detection field spatially encompasses a central portion of said scan field within said operative scanning range.

30. The automatic code symbol reading system of claim 21, wherein said processing means and said control means are disposed within said compact housing.

31. An automatic code symbol reading system comprising:

(A) a laser projection scanning device supportable within a workspace, and including (1) a compact housing having a light transmissive window through which light can exit and enter said hand-supportable housing, (2) scan data producing means, disposed in said compact housing, for producing scan data from a code symbol, comprising graphical indicia of different light reflectivity, said scan data producing means including (2) (a) laser beam source for producing a laser beam projected through said light transmissive window and into a scan field defined external to said compact housing, (2) (b) a scanning mechanism for scanning said laser beam across said scan field according to a laser scanning pattern characterized as having at least one scanning plane of essentially planar extent, and (2) (c) light detection means for detecting the intensity of laser light reflected off a code symbol as said laser beam is scanned across said scan field and said code symbol therein, and for automatically producing scan data indicative of the detected intensity of said reflected laser light, and (3) object detection means in said compact housing for detecting the presence of an object within an object detection field definable external to said compact housing, and producing in response thereto an activation signal, said object detection field being characterized as having a volumetric extent and said laser projection scanning device having an operative scanning range measured from a distant in front of said light transmissive window out towards a region within scan field, and said object detection field being proximate to at least a portion of said scan field within said operative scanning range;

(B) processing means for processing produced scan data so as to decode said code symbol on said detected object, and upon decoding said code symbol on said detected object, automatically producing symbol character data representative of said decoded code symbol; and (C) control means for controlling the operation of said automatic code symbol reading system.

32. The automatic code symbol reading system of claim 31, wherein said control means comprises:

means for automatically activating said activatable scan data producing means for up to a predetermined time period in response to the generation of said activation signal; and means for automatically deactivating said activatable scan data producing means in response to said processing means failing to decode said code symbol on said detected object within said predetermined time period.

33. The automatic code symbol reading system of claim 31, wherein said object detection means has at least a short-range mode of object detection and a long-range mode of object detection, wherein said object detection means is in said short range made of object detection, said object detection means is capable of detecting the presence of the object located within a short range measured from a distance in front of said light transmissive window out towards a first region within said object detection field, and wherein, when said object detection means is in said long-range mode of object detection, said object detection means is capable of detecting the presence of the object located within a long range measured from a distance in front of said light transmissive window out towards a second region within said object detection field.

34. The automatic code symbol reading system of claim 33, wherein said code symbol scanning device further comprises means for operating said object detection means in said short range mode of object detection in response to the absence of a long range mode activation signal, and for operating said object detection means in said long range mode of object detection in response to the presence of said long range mode activation signal.

35. The automatic code symbol reading system of claim 31, wherein said object detection means comprises means for transmitting an infra-red light signal into said object detection field, and means for receiving at least a portion of said transmitted infra-red light signal reflected off the object in said object detection field and producing said activation signal in response thereto.

36. The automatic code symbol reading system of claim 31, wherein said code symbol is a bar code symbol.

37. The automatic code symbol reading system of claim 31, wherein said object detection means comprises a synchronous receiver/transmitter.

38. The automatic code symbol reading system of claim 31, wherein said compact housing comprises a hand-supportable housing having a longitudinal dimension which extends in longitudinal direction, and wherein said scan field and said object detection field extend from about, said light transmission window in a direction substantially parallel to the longitudinal extent of said hand-supportable housing.

39. The automatic code symbol reading system of claim 38, wherein said hand-supportable housing comprises a head portion and a handle portion.

40. The automatic code symbol system reading system of claim 31, wherein said processing means and said control means are disposed in said compact housing.

41. The automatic code symbol reading system of claim 31, wherein said object detection field spatially encompasses a central portion of said scan field within said operative scanning range.

* * * * *